(12) United States Patent
Naganuma

(10) Patent No.: US 10,677,245 B2
(45) Date of Patent: Jun. 9, 2020

(54) VARIABLE DISPLACEMENT PUMP

(71) Applicant: HITACHI AUTOMOTIVE SYSTEMS, LTD., Hitachinaka-shi, Ibaraki (JP)

(72) Inventor: Atsushi Naganuma, Atsugi (JP)

(73) Assignee: HITACHI AUTOMOTIVE SYSTEMS, LTD., Hitachinaka-Shi (JP)

( * ) Notice: Subject to any disclaimer, the term of this patent is extended or adjusted under 35 U.S.C. 154(b) by 122 days.

(21) Appl. No.: 15/547,958

(22) PCT Filed: Jan. 27, 2016

(86) PCT No.: PCT/JP2016/052228
§ 371 (c)(1),
(2) Date: Aug. 1, 2017

(87) PCT Pub. No.: WO2016/125639
PCT Pub. Date: Aug. 11, 2016

(65) Prior Publication Data
US 2018/0023564 A1    Jan. 25, 2018

(30) Foreign Application Priority Data
Feb. 6, 2015 (JP) ................... 2015-021706

(51) Int. Cl.
*F04C 14/22* (2006.01)
*F01M 1/16* (2006.01)
(Continued)

(52) U.S. Cl.
CPC ............. *F04C 14/223* (2013.01); *F01M 1/02* (2013.01); *F01M 1/16* (2013.01); *F04C 2/344* (2013.01);
(Continued)

(58) Field of Classification Search
CPC ...... F04C 15/008; F04C 2/344; F04C 13/001; F04C 2270/185; F04C 2210/206;
(Continued)

(56) References Cited

U.S. PATENT DOCUMENTS

2013/0164163 A1* 6/2013 Ohnishi ................. F04C 2/344
418/27
2014/0072456 A1* 3/2014 Watanabe ............. F04C 2/3442
417/218
(Continued)

FOREIGN PATENT DOCUMENTS

JP  2013-130089 A  7/2013
JP  2014-051923 A  3/2014
(Continued)

*Primary Examiner* — Peter J Bertheaud
*Assistant Examiner* — Dnyanesh G Kasture
(74) *Attorney, Agent, or Firm* — Foley & Lardner LLP

(57) ABSTRACT

A variable displacement pump includes: a pump constituting section; a movable member; a first control hydraulic chamber; a second control hydraulic chamber; a control mechanism arranged to be actuated by receiving a control hydraulic pressure which is the discharge pressure on a downstream side of the discharge portion, through a single control passage formed within the engine, and to control a supply and a discharge of the discharge pressure with respect to the second control hydraulic chamber; and a switching mechanism arranged to switch a connection and a disconnection between the control passage and the control mechanism.

20 Claims, 20 Drawing Sheets

(51) Int. Cl.
*F01M 1/02* (2006.01)
*F04C 2/344* (2006.01)
*F04C 13/00* (2006.01)
*F04C 15/00* (2006.01)
*F01M 1/08* (2006.01)

(52) U.S. Cl.
CPC .......... *F04C 13/001* (2013.01); *F04C 14/226* (2013.01); *F04C 15/008* (2013.01); *F01M 1/08* (2013.01); *F01M 2001/0238* (2013.01); *F01M 2001/0269* (2013.01); *F04C 2210/206* (2013.01); *F04C 2270/185* (2013.01); *F16N 2280/00* (2013.01)

(58) Field of Classification Search
CPC ...... F04C 14/223; F04C 14/226; F04C 14/22; F01M 1/16; F01M 1/02; F01M 2001/0238; F01M 2001/0269; F01M 1/08; F16N 2280/00
See application file for complete search history.

(56) References Cited

U.S. PATENT DOCUMENTS

| | | | |
|---|---|---|---|
| 2014/0072458 A1 | 3/2014 | Watanabe | |
| 2014/0147322 A1* | 5/2014 | Saga | F04C 2/344 418/24 |
| 2014/0147323 A1* | 5/2014 | Watanabe | F04C 2/3442 418/27 |
| 2015/0020759 A1* | 1/2015 | Watanabe | F04C 2/3442 123/90.15 |
| 2015/0218983 A1* | 8/2015 | Watanabe | F04C 2/3442 210/130 |
| 2017/0030351 A1 | 2/2017 | Saga | |

FOREIGN PATENT DOCUMENTS

| | | | | |
|---|---|---|---|---|
| JP | WO 2014038302 A1 * | 3/2014 | ........... | B01D 35/005 |
| JP | 2014-105622 A | 6/2014 | | |
| WO | WO-2012/149931 A2 | 11/2012 | | |

* cited by examiner

VARIABLE DISPLACEMENT PUMP

TECHNICAL FIELD

This invention relates to a variable displacement pump arranged to supply an oil for lubrication of sliding portions of an internal combustion engine, a driving source for auxiliary equipment and so on of the internal combustion engine, and so on.

BACKGROUND ART

There are conventional variable displacement pumps of various types. There is known a below-described patent document 1 which is one of the conventional variable displacement pumps, and which was filed by the applicant.

In this variable displacement pump, the hydraulic pressure is supplied to two first and second control hydraulic chambers through a main oil gallery formed inside the internal combustion engine on the downstream side of a pump discharge passage. The hydraulic fluid is discharged from a drain passage. With these, an eccentric amount of a cam ring with respect to a center of a rotor is varied so as to vary the pump discharge amount.

That is, the first control hydraulic chamber is arranged to act the cam ring in a direction in which the eccentric amount of the cam ring is decreased, by the hydraulic pressure supplied from a first bifurcated passage bifurcated from the main oil gallery. On the other hand, the second control hydraulic chamber is arranged to act the cam ring in a direction in which the eccentric amount of the cam ring is increased, by the hydraulic pressure supplied from a second bifurcated passage from the main oil gallery. The second control hydraulic chamber is arranged to be controlled to be switched to be connected through a pilot valve to the second bifurcated passage, or to be connected to the drain passage, by switching operation of an electromagnetic switching valve provided to an engine main body.

The hydraulic pressure from the main oil gallery to the second control hydraulic chamber is controlled in accordance with the pump rotation speed so as to control to increase or decrease the eccentric amount of the cam ring. With this, the pump discharge pressure is controlled to two stage characteristics of a low pressure characteristics and a high pressure characteristics.

PRIOR ART DOCUMENT

Patent Document

Japanese Patent Application Publication No. 2014-105622

SUMMARY OF THE INVENTION

Problems which the Invention is Intended to Solve

As described above, the variable displacement pump described in patent document 1, the hydraulic pressure is directly supplied to or discharged from the first control hydraulic chamber and the second control hydraulic chamber from the first bifurcated passage bifurcated from the main oil gallery. Alternatively, the hydraulic pressure is indirectly supplied to or discharged from the first control hydraulic chamber and the second control hydraulic chamber from the second bifurcated passage through the electromagnetic switching valve and the pilot valve. Accordingly, both the first and second bifurcated passages are formed inside the engine main body like the main oil gallery since the electromagnetic switching valve is provided to the engine main body.

Therefore, the forming operation of the bifurcated passages are complicated, so that the manufacturing cost is increased.

It is, therefore, an object of the present invention to provide a variable displacement pump devised to solve the above-mentioned problems, and to obtain two stage hydraulic pressure characteristics by a single control passage even when the electromagnetic switching valve is provided to the engine main body.

Means for Solving the Problem

A variable displacement pump comprises: a pump constituting section arranged to be driven and rotated by an engine, to vary volumes of a plurality of pump chambers, and thereby to discharge an oil sucked from a suction portion from a discharge portion; a movable member arranged to be moved to vary variation amounts of the volumes of the pump chambers; an urging mechanism provided with a set load, and arranged to urge the movable member in a direction in which the variation amounts of the volumes of the plurality of the pump chambers are increased; a first control hydraulic chamber arranged to receive a discharge pressure from the discharge portion, and thereby to act a force to the movable member in a direction in which the variation amounts of the volumes of the plurality of the pump chambers are decreased; a second control hydraulic chamber arranged to receive the discharge pressure from the discharge portion, and thereby to act a force to the movable member in a direction in which the variation amounts of the volumes of the plurality of the pump chambers are increased; a control mechanism arranged to be actuated by receiving a control hydraulic pressure which is the discharge pressure on a downstream side of the discharge portion, through a single control passage formed within the engine, and to control a supply and a discharge of the discharge pressure with respect to the second control hydraulic chamber; and a switching mechanism arranged to switch a connection and a disconnection between the control passage and the control mechanism.

Benefit of the Invention

By the present invention, it is possible to obtain the two stage hydraulic characteristics by the single control passage even when the electromagnetic switching valve is provided to the engine main body.

BRIEF DESCRIPTION OF DRAWINGS

FIG. 16A shows a pilot valve. FIG. 16B shows a second pilot valve.

DESCRIPTION OF EMBODIMENTS

Hereinafter, variable displacement pumps according to a plurality of embodiments of the present invention are explained in detail with reference to the drawings.

First Embodiment

Figure 1:
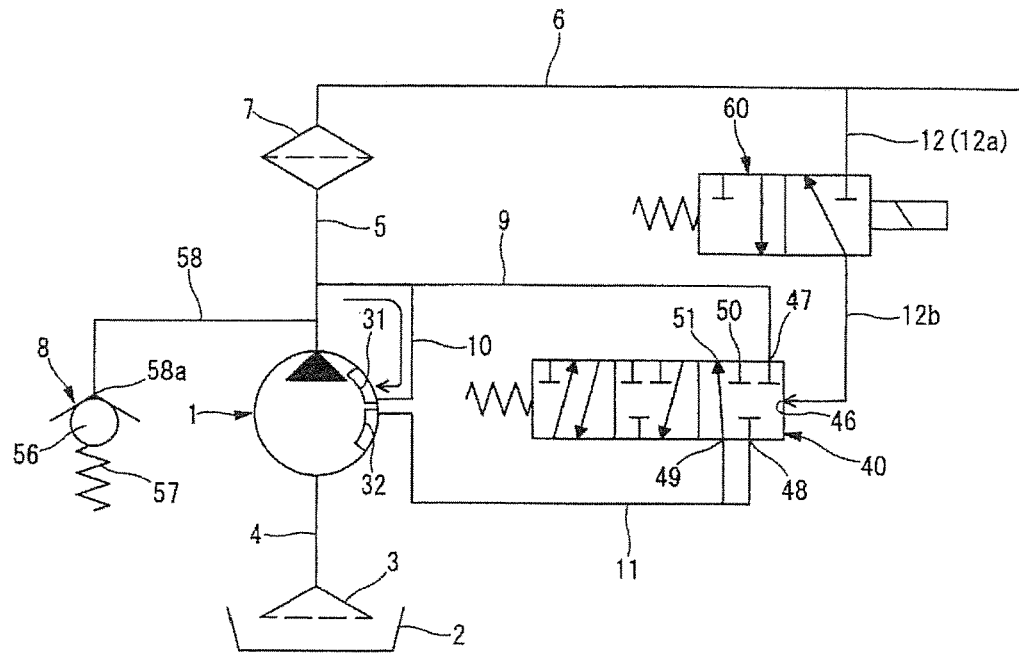
FIG. 1 is a schematic view showing a hydraulic circuit and an oil pump of a variable displacement pump according to an embodiment of the present invention.

FIG. 1 shows a hydraulic circuit and a variable displacement oil pump according to this embodiment. The variable displacement oil pump 1 is arranged to be rotated by a rotation force transmitted from a crank shaft of an internal combustion engine, to suck an oil stored in an oil pan 2 from an suction passage 4 through a strainer 3, and to discharge the oil from a discharge passage 5 which is a discharge portion to a main oil gallery 6 formed within the engine.

The main oil gallery 6 is arranged to supply the oil to an oil jet arranged to inject a coolant oil to a sliding portion of the engine such as a piston, a valve timing control device (VTC), and a bearing of the crank shaft.

An oil filter 7 is provided on a downstream side of the discharge passage 5. The oil filter 7 catches (collects) foreign matters within the flowing oil. Moreover, a pressure regulating valve 8 is provided on the downstream side of the discharge passage 5. The pressure regulating valve 8 is arranged to suppress breakage (failure) of the oil filter 7 when the discharge pressure becomes excessive.

Furthermore, a first supply passage 9 is bifurcated from the discharge passage 5 between the oil filter 7 and the pressure regulating valve 8. A second supply passage 10 is bifurcated from the first supply passage 9. The second supply passage 10 is constantly connected to a first control hydraulic chamber 31.

The first supply passage 9 is arranged to be connected to or disconnected from a second control hydraulic chamber 32 through a supply and discharge passage 11 and a pilot valve 40 which is a control mechanism.

The pilot valve 40 is connected to a control passage 12 bifurcated from the main oil gallery 6 through an electromagnetic switching valve 60 which is a switching mechanism, and which is provided in an engine main body (cylinder block).

Figure 2:
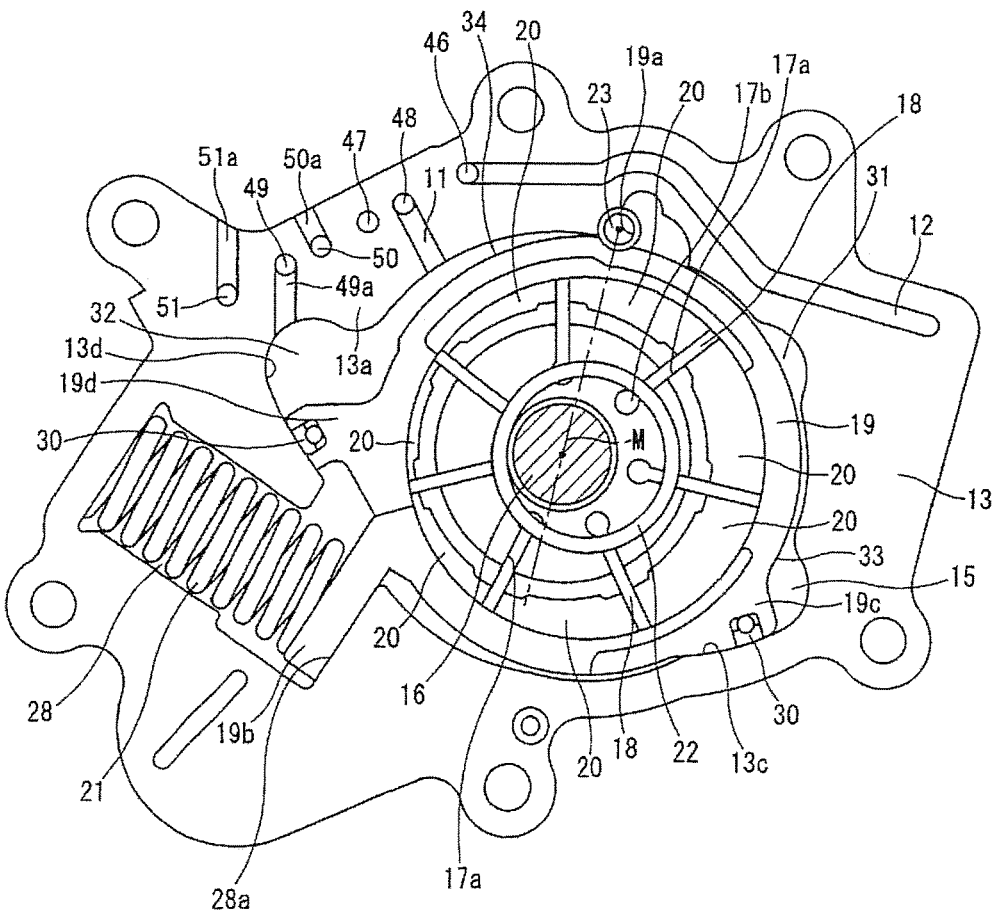
FIG. 2 is a front view showing a state where a cover member of the oil pump according to this embodiment is detached.
Figure 3:
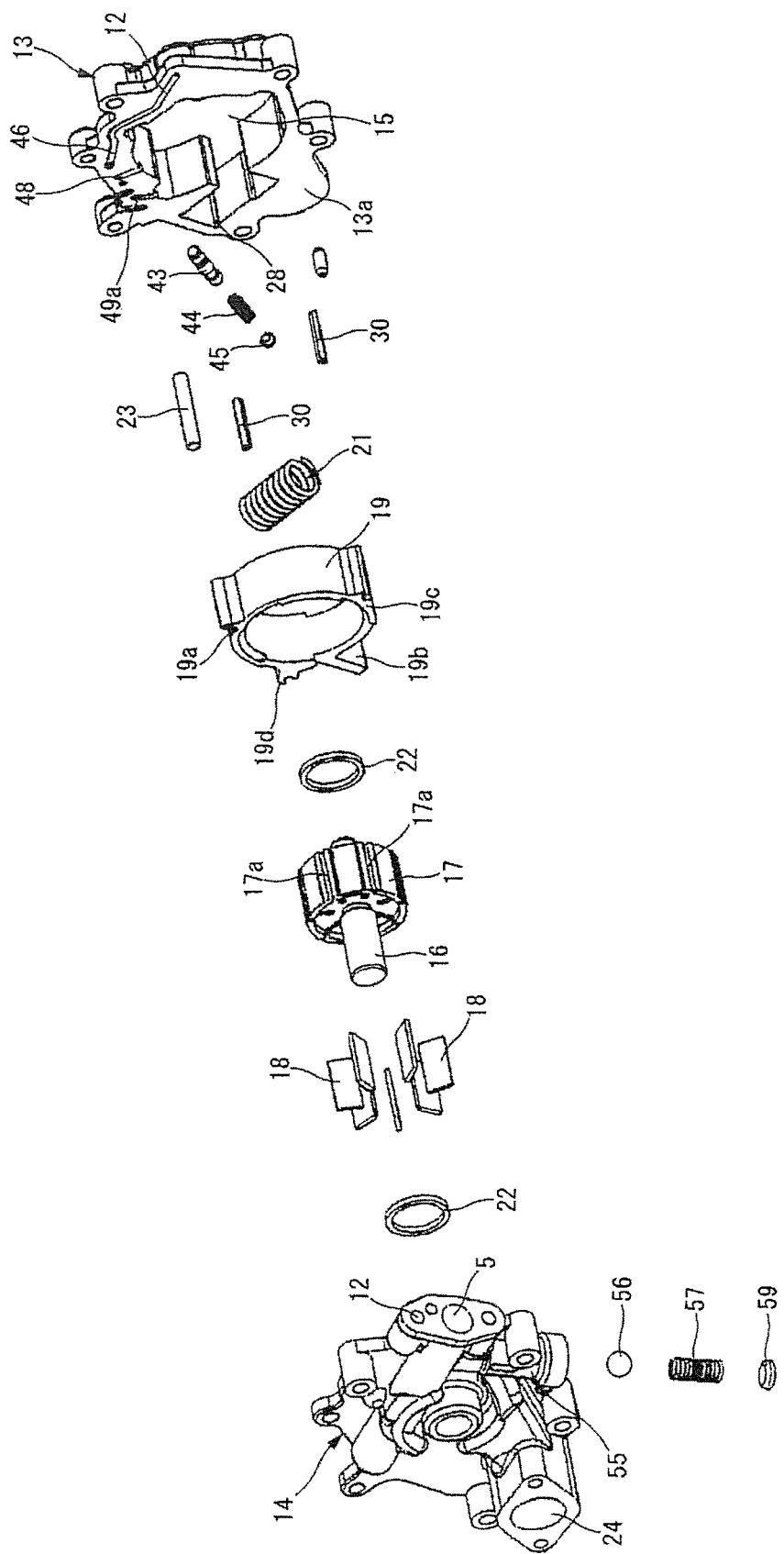
FIG. 3 is an exploded perspective view showing the oil pump according to this embodiment.

The oil pump 1 includes a pump body 13 which is provided at a front end portion of the cylinder block of the internal combustion engine (not shown), which has a U-shaped section, and which includes one end side opening, and a pump receiving chamber 15 formed within the pump body 13, as shown in FIG. 2 and FIG. 3; a cover member 14 closing the one end opening of the pump body 13; a driving shaft 16 which penetrates through a substantially center portion of the pump receiving chamber 15, which is rotatably supported by the pump body 13 and the cover member 14, and which is driven and rotated by the crank shaft of the engine; a rotor 17 which is rotatably received within the pump receiving chamber 15, and which includes a central portion connected to the driving shaft 16; a plurality of vanes 18 each of which is received within one of a plurality of slits 17a formed on an outer circumference portion of the rotor 17 by being cut in radial directions, and each of which is arranged to be projectable into and retractable from the one of the slits 17a; a cam ring 19 which is disposed radially outside the vanes 18, which is arranged to be eccentrically swung (eccentrically moved) with respect to a center of a rotation of the rotor 17, and which separates a plurality of pump chambers 20 with the rotor 17 and adjacent two of the vanes 18 and 18; a coil spring 21 which is received within the pump body 13, and which is an urging mechanism arranged to constantly urge the cam ring 19 in a direction in which an eccentric amount of the cam ring 19 with respect to the rotation center of the rotor 19 is increased; and a pair of ring members 22 and 22 which are slidably disposed on inner circumference sides of the rotor 17 on both side portions of the rotor 17, and which have diameters smaller than the rotor 17. The driving shaft 16, the rotor 17, and the vanes 18 constitute a pump constituting section.

The pump body 13 is integrally formed from an aluminum alloy. The pump body 13 includes a bearing hole 13a which is formed at a substantially central position of a bottom surface 15a of the pump receiving chamber 15, which penetrates through the pump body 13, and which rotatably supports one end portion of the driving shaft 16. Moreover, the pump body 13 includes a support hole 13b which is formed at a predetermined position of an inner circumference wall of the pump receiving chamber 15 that is an inner side surface of the pump body 13, and in which a pivot pin 23 swingably supporting the cam ring 19 is inserted and fixed. Besides, a downstream side opening end of a passage groove 13g to which the oil is supplied from a discharge port 25 (described later) confronts an inside of the bearing hole 13a.

Moreover, first and second seal sliding surfaces 13c and 13d are formed in an inner circumferential wall of the pump receiving chamber 15 on both sides of a linear line (hereinafter, referred to as "cam ring reference line") M connecting a center of the bearing hole 13a and a center of the support hole 13b, as shown in FIG. 2. Seal members 30 and 30 (described later) disposed on the outer circumference portion of the cam ring 19 are slid, respectively, on the first and second sliding surfaces 13c and 13d.

Figure 6:
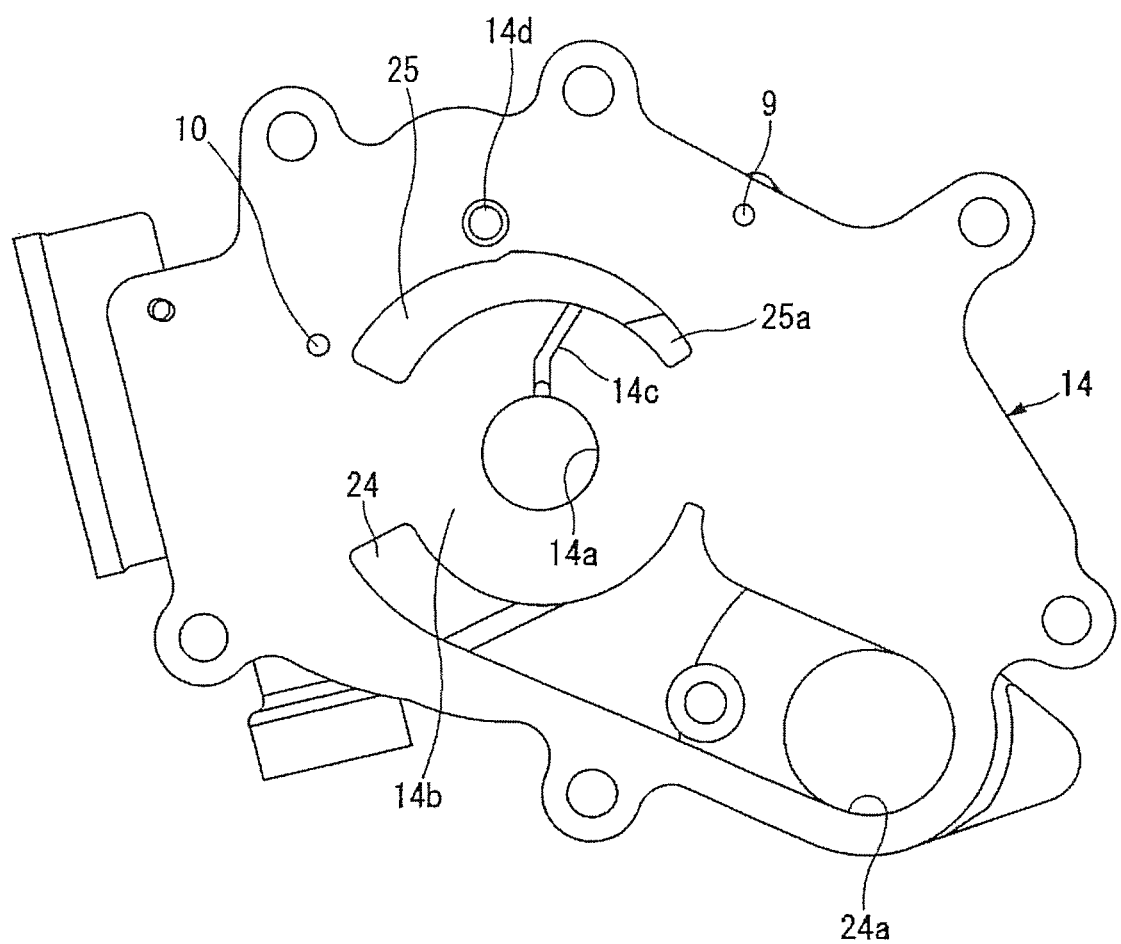
FIG. 6 is a front view showing the cover member in this embodiment.

As shown in FIG. 2 and FIG. 6, the cover member 14 includes a cylindrical portion formed on an outer side portion at a position corresponding to the bearing hole 13a of the pump body 13; and a bearing hole 14a which is formed on an inner circumference surface of this cylindrical portion, which penetrates through the cover member 14, and which rotatably supports the other end side of the drive shaft 16. This cover member 14 is mounted on the opening end surface of the pump body 13 by a plurality of bolts 26.

Moreover, as shown in FIG. 2, FIG. 3, and FIG. 6, a suction port 24 and a discharge port 25 are formed by cutting on a bottom surface 14b of the cover member 14 and a bottom surface 15a of the pump receiving chamber 15 on the outer circumference region of the bearing hole 14a to substantially confront each other to sandwich the bearing hole 14a. The suction port 24 is a suction port which has a recessed shape. The discharge port 25 is a discharge portion which has a substantially arc recessed shape. The suction port 24 is opened in a region (suction region) in which inside volumes of the pump chambers 20 are increased in accordance with a pump operation of the pump constituting section. The discharge port 25 is a opened in a region (discharge region) in which the inside volumes of the pump chambers 20 are decreased in accordance with the pump operation of the pump constituting section.

A suction hole 24a is formed on one end portion side of the suction port 24. The suction hole 24a extends toward a spring receiving chamber 28 (described later). The suction hole 24a penetrates through the bottom wall of the cover member 14 to be opened to an outside. With this, the lubricant oil stored in the oil pan 2 is sucked into the pump chambers 20 in the suction region, through the suction passage 4, the suction hole 24a, and the suction port 24 based on a negative pressure generated in accordance with the pump operation of the pump constituting section.

A discharge hole 25a is formed in the discharge port 25 at an upper position in FIG. 6. The discharge hole 25a penetrates through the bottom wall of the cover member 14 to be connected through the discharge passage 5 to the main oil gallery 6.

By these structures, the oil pressurized by the pump operation of the pump constituting section, and discharged from the pump chambers 20 in the discharge region is supplied through the discharge port 25, the discharge hole 25a, and the discharge passage 5 to the main oil gallery 6, and supplied to the sliding portions within the engine, and the valve timing control device.

Figure 7:
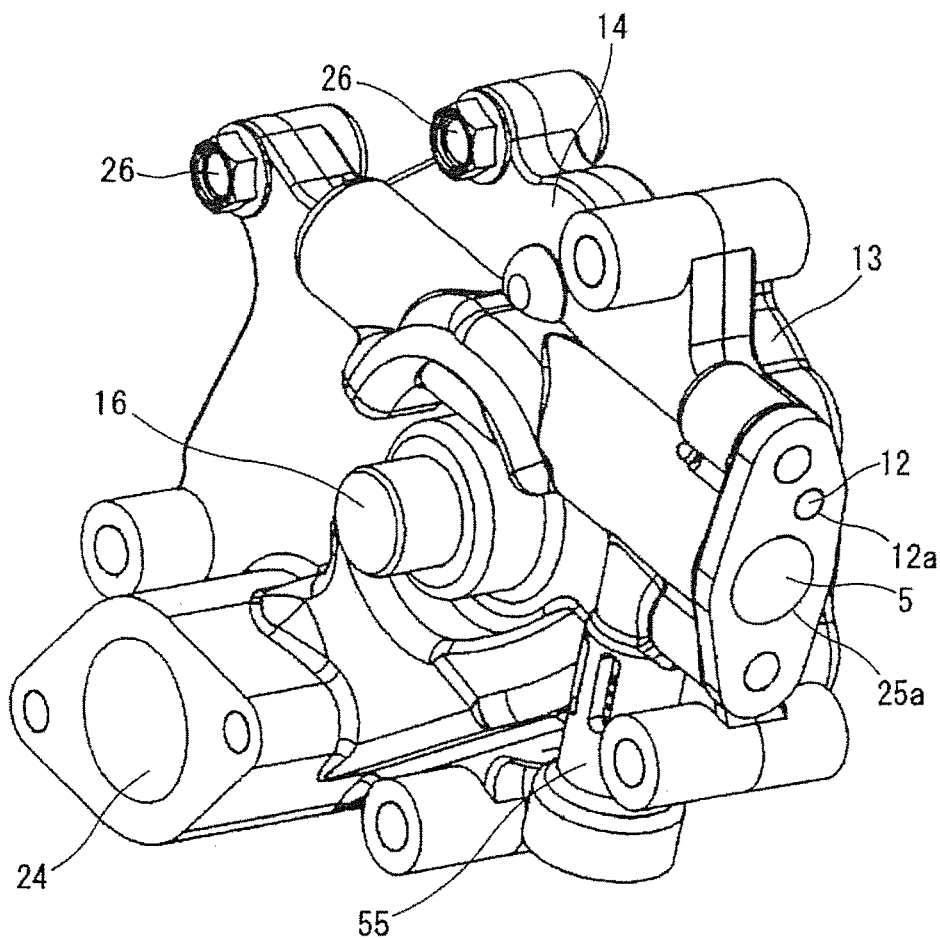
FIG. 7 is a perspective view showing the oil pump according to this embodiment.

Moreover, as shown in FIG. 7, a pressure receiving hole 12a is formed and opened adjacent to the opening of the discharge hole 25a. The pressure receiving hole 12a receives the control hydraulic pressure through the electromagnetic switching valve 60.

Besides, the suction and discharge ports 24 and 25 may be formed on the pump receiving chamber 15 of the pump body 13 in place of the bottom surface of the cover member 14.

The drive shaft 16 is arranged to rotate the rotor 17 in a counterclockwise direction in FIG. 2 by the rotation force transmitted from the crank shaft (not shown) to the pulley and so on.

As shown in FIG. 2, the rotor 17 includes the seven slits 17a formed by cutting in the radial directions from the inner center side to the radially outer side. Moreover, the rotor 17 includes back pressure chambers 17b each of which has a substantially circular section, each of which is formed at an inside base end portion of one of the slits 17a, and into which the discharge oil discharged to the discharge port 25 is introduced. With this, the vanes 18 are pushed in the outward direction by the centrifugal force according to the rotation of the rotor 17, and the hydraulic pressures of the back pressure chambers 17b.

Each of the vanes 18 includes a tip end surface slidably abutted on the inner circumference surface of the cam ring 19, and an inner end surface of the base end portion which is slidably abutted on the outer circumference surfaces of the ring members 22 and 22. With this, even when the engine speed is low and the centrifugal force and the hydraulic pressures of the back pressure chambers 17b are small, the pump chambers 20 are liquid-tightly separated by the outer circumference surface of the rotor 17, the inner side surfaces of the adjacent vanes 18 and 18, the inner circumference surface of the cam ring 19, and the bottom surface 15a of the pump receiving chamber 15 of the pump body 13 and the inner side surface of the cover member 14 which are the side surfaces.

Figure 8:
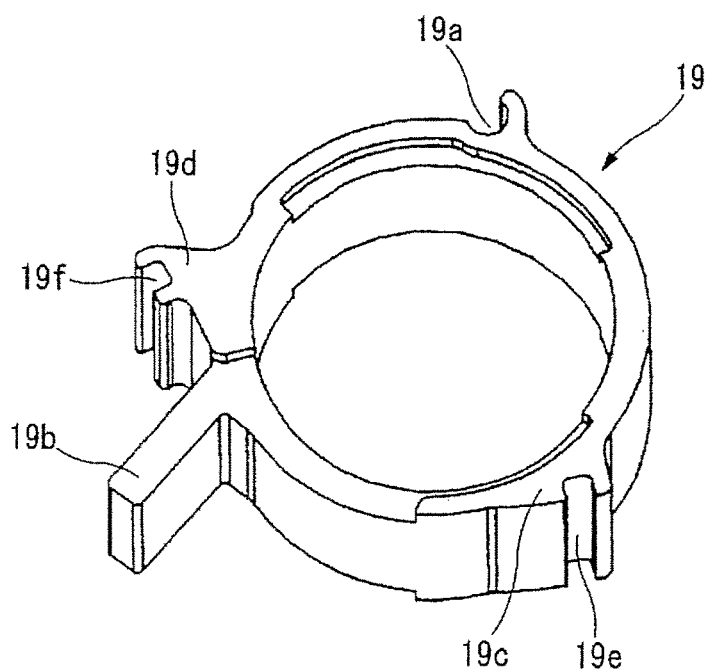
FIG. 8 is a perspective view showing a cam ring in the embodiment.

As shown in FIG. 8, the cam ring 19 is integrally formed into an annular shape by sintered metal. The cam ring 19 includes a pivot groove 19a which is formed along the axial direction at a predetermined position of an outer circumference portion to protrude, which has a substantially arc recessed shape, and which is mounted on the pivot pin 23 to constitute an eccentric swing fulcrum. Moreover, the cam ring 19 includes an arm portion 19b which is formed at a position opposite to the pivot groove 19a with respect to the center of the cam ring 19, which is linked with the coil spring 21, and which protrude in the radial direction.

In this case, the pump body 13 includes the spring receiving chamber 28 which is formed within the pump body 13, and which is connected to the pump receiving chamber 15 through a connection portion 27 formed at a position opposite to the support hole 13b. The coil spring 21 is received with this spring receiving chamber 28.

This coil spring 21 is elastically held with a predetermined set load W between the bottom surface of the spring receiving chamber 28 and a lower surface of the tip end portion of the arm portion 19b extending through the connection portion 27 to the spring receiving chamber 28.

Accordingly, the coil spring 21 constantly urges the cam ring 19 though the arm portion 19b by the elastic force based on the spring load W in a direction (in the counterclockwise direction in FIG. 2) in which the eccentric amount of the cam ring 19 is increased. With this, in the cam ring 19, an upper surface of the arm portion 19b is pressed and abutted on a stopper surface 28a which is formed on a lower surface of an upper wall of the spring receiving chamber 28 by the spring force of the coil spring 21 when the pump is not operated, so that the cam ring 19 is held at a position at which the eccentric amount of the cam ring 19 with respect to the rotation center of the rotor 17 is maximum.

Moreover, as shown in FIG. 8, two first and second seal constituting portions 19c and 19d are formed on the outer circumference portion of the cam ring 19 to protrude. Each of the first and second seal constituting portions 19c and 19d has a substantially triangle cross section. The first and second seal constituting portions 19c and 19d include first and second seal surfaces formed to confront the first and second seal sliding abutment surfaces 13c and 13d. The first and second seal constituting portions 19c and 19d include, respectively, first and second seal holding grooves 19e and 19f formed by cutting on the seal surfaces. Each of the first and seal holding grooves 19e and 19f has a substantially U-shaped cross section. The seal members 30 are received and held, respectively, in the seal holding grooves 19e and 19f. The seal members 30 are made from rubber material. The seal members 30 are abutted and slid on the seal sliding abutment surfaces 13c and 13d at the eccentric swing movement of the cam ring 19.

In this case, each of the first and second seal surfaces has a predetermined radius which is from a center of the pivot groove 19a, and which is slightly smaller than radii R1 and R2 of the seal sliding abutment surfaces 13c and 13d that are from the center of the pivot groove 19a. Minute clearances C are formed between the seal surfaces and the seal sliding abutment surfaces 13c and 13d.

The two seal members 30 are made, for example, from fluorine-based resin having a low frictional characteristic. Each of the first and second seal members 30 has a linear elongated shape extending in the axial direction of the cam ring 19. The seal members 30 are pressed on the seal sliding abutment surfaces 13c and 13d by the elastic forces of the elastic members which are made from the rubber, and which are disposed on the bottom portions of the seal holding grooves 19e and 19f. With this, the good liquid-tightness of the first and second control hydraulic chambers 31 and 32 are constantly ensured.

Moreover, as shown in FIG. 2, the first control hydraulic chamber 31 and the second control hydraulic chamber 32 described above are separated on the outer circumference region of the cam ring 19 on the pivot groove 19a's side which is the pump discharge side, between it and the inner side surface of the pump body 13, by the outer circumference surface of the cam ring 19, the pivot groove 19a, the seal members 30, and the inner side surface of the pump body 13, on both sides of the pivot groove 19a.

The first control hydraulic chamber 31 on the right side of the pivot groove 19a in FIG. 2 is connected through the second supply passage 10 to the discharge passage 5. The discharge pressure of this discharge passage 5 is constantly supplied to the first control hydraulic chamber 31.

The first pressure receiving surface 33 constituted by the outer circumference surface of the cam ring 19 which confronts this first control hydraulic chamber 31 receives the discharge pressure from the second supply passage 10 against the urging force of the coil spring 21 so as to provide the swing force (the movement force) in a direction (a clockwise direction in FIG. 2) in which the eccentric amount of the cam ring 19 is decreased, as shown in FIG. 2.

That is, this first control hydraulic chamber 31 constantly acts (operates) the cam ring 19 through the first pressure receiving surface 33 in a direction in which the center of cam ring 19 is closer to the center of the rotation of the rotor 17 to be concentric with the rotor 17, that is, in the direction in which the eccentric amount is decreased. With this, the first control hydraulic chamber 31 is arranged to control the movement amount of the cam ring 19 in the concentric direction.

The second control hydraulic chamber 32 which is on the left side of the pivot groove 19a is arranged to receive the discharge pressure of the discharge passage 5 which flows into the first supply passage 9, through the pilot valve 40.

Furthermore, the cam ring 19 includes a second pressure receiving surface 34 formed on the outer circumference surface of the cam ring 19 to confront this second control hydraulic chamber 32. The second pressure receiving surface 34 receives the discharge pressure to act the force in a direction to assist the urging force of the coil spring 21, so as to provide, to the cam ring 19, the swing force (the movement force) in the direction (the counterclockwise direction in FIG. 2) in which the eccentric amount of the cam ring 19 is increased.

In this case, as shown in FIG. 2, the pressure receiving area of the first pressure receiving surface 33 is formed to be greater than the pressure receiving area of the second pressure receiving surface 34, so that the urging force in the eccentric direction of the cam ring 19 which are the urging force based on the inside pressure of the second control hydraulic chamber 32 and the urging force of the coil spring 21, and the urging force based on the inside pressure of the first control hydraulic chamber 31 are balanced with each other in a predetermined force relationship. As described above, the hydraulic pressure within the second control hydraulic chamber 32 assists the urging force of the coil spring 21. That is, the second control hydraulic chamber 32 is arranged to act the pump discharge pressure supplied though the pilot valve 40 as necessary, to the second pressure receiving surface 34 so as to assist the urging force of the coil spring 21. With this, the second control hydraulic chamber 32 controls the movement amount in the direction in which the eccentric amount of the cam ring 19 is increased.

Moreover, in a case where the pilot valve 40 regulates the pressure within the second control hydraulic chamber 32 like the first embodiment, the sizes of the first pressure receiving surface 33 and the second pressure receiving surface 34 are arbitrary.

Besides, the second supply passage 10 may be formed on the side surface of the cam ring 19, or the side surfaces of the cover member 14 and the pump body 13.

The pilot valve 40 is integrally provided with an outer side wall of the pump body 13. The pilot valve 40 is disposed on the left side of the cam ring reference line M shown in FIG. 2 on the outer side of the second control hydraulic chamber 32.

Figure 9:
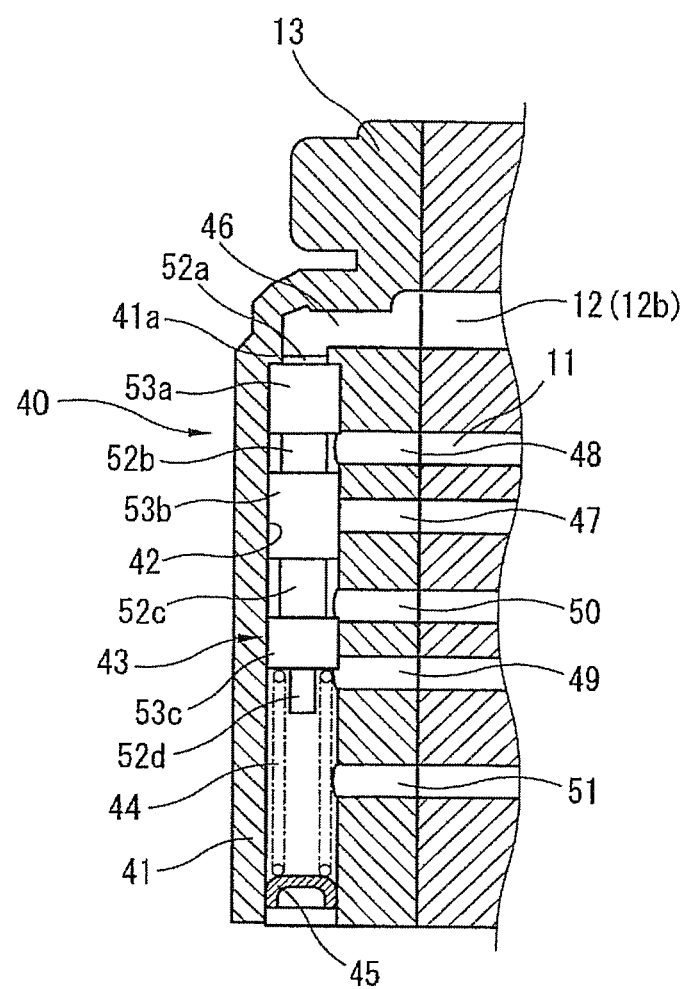
FIG. 9 is a longitudinal sectional view showing a pilot valve in this embodiment.

That is, as shown in FIG. 9, this pilot valve 40 includes a cylindrical valve body 41 integrally provided with the outer side wall of the pump body 13; a spool valve 43 which is slidably provided within a sliding hole 42 formed within the valve body 41; a valve spring 44 arranged to urge the spool valve 43 in an upward direction in the drawing; and a plug 45 closing an opening end of a lower portion of the valve body 41 in a state where the spring load of the valve spring 44 is provided.

The valve body 41 includes a pilot pressure introduction port 46 which is formed at an upper end portion of the sliding hole 42 in the axial direction, and which is an introduction port having a diameter smaller than that of the sliding hole 42. A small diameter stepped portion 41a between this pilot pressure introduction port 46 and the sliding hole 42 is a seat surface on which the spool valve 43 is seated by being urged in the upward direction by the spring force of the valve spring 44 when the hydraulic pressure from the pilot pressure introduction port 46 is not acted to the spool valve 43.

The pilot pressure introduction port 46 of the valve body 41 is connected to a downstream end of the control passage 12 on the downstream side of the electromagnetic switching valve 60. Furthermore, the valve body 41 includes a first supply port 47, a second supply port 48, a first drain port 49, a second drain port 50, and a third drain port 51 which are formed on a circumferential wall confronting the sliding hole 42, and which penetrate in the radial direction. The first supply port 47 is arranged to be connected to the downstream side of the first supply passage 9. The second supply port 48 is arranged to be connected to the first supply port 47, and to be connected through the supply and discharge passage 11 to the second control hydraulic chamber 32. The first drain port 49 is arranged to be connected to the second control hydraulic chamber 32 in accordance with a movement position of the spool valve 43. The second drain port 50 is arranged to be connected to the first drain port 49 in accordance with the movement position of the spool valve 43. The third drain port 51 is arranged to be connected to the first drain port 49 in accordance with the movement position of the spool valve 43. The third drain port 51 has a function as an air vent hole to ensure the good slidability of the spool valve 43.

Furthermore, as shown in FIG. 2, the first drain port 49 is connected to the atmospheric pressure outside the pump through a first drain groove 49a formed on the mounting surface 13a of the pump body 13 for the cover member 14. The second drain port 50 and the third drain port 51 are connected to the atmospheric pressure outside the pump through second and third drain grooves 50a and 51a formed on the mounting surface 13a.

Besides, the first drain port 49, the second drain port 50, and the third drain port 51 may be connected to the suction port 24, in place of the atmospheric pressure.

The spool valve 43 includes a first small diameter shaft portion 52a which is formed on the pilot pressure introduction port 46 side, and which is arranged to receive the control hydraulic pressure introduced from main oil gallery 6 through the control passage 12 from the pilot pressure introduction port 46 by an upper end surface that is a pressure receiving surface; a first land portion 53a provided below the first small diameter shaft portion 52a; a second land portion 53b which is provided through a second small diameter shaft portion 52b below the first land portion 53a; a third land portion 53c which is provided through a third small diameter shaft portion 52c below the second land portion 53b; and a fourth small diameter shaft portion 52d which is provided at a lower end of the third land portion 53c, and which supports an upper end portion of the valve spring 44.

The first land portion 53a to the third land portion 53c are formed into a cylindrical shape having the same outside diameter. The first land portion 53a to the third land portion 53c are arranged to be slid through minute clearance between the inner circumference surface of the sliding hole 42 and the first land portion 53a to the third land portion 53c.

Moreover, the second small diameter shaft portion 52b and the third small diameter shaft portion 52c include passages in which the hydraulic fluid and the hydraulic pressure flow by an annular groove formed on the outer circumference. Below-described embodiments have this configuration.

The spool valve 43 is arranged to be moved in the downward or upward direction by relative pressure between the spring force of the valve spring 44 and the control hydraulic pressure received on the upper end surface of the first small diameter shaft portion 52a from the pilot pressure introduction port 46, and thereby to open and close (connect) the ports 47 to 51.

That is, in a case where the upper end surface of the first small diameter shaft portion 52a does not receive the control hydraulic pressure, the land portions 53a to 53 disconnect the first supply port 47 and the second supply port 48, and disconnect the first drain port 49 and the second drain port 50. However, the first drain port 49 and the third drain port 51 are connected to each other.

On the other hand, in a case where the upper end surface of the first small diameter shaft portion 52a receives the control hydraulic pressure which is equal to or greater than the predetermined pressure, the land portions 53a to 53c are moved in the downward direction in accordance with the control hydraulic pressure so as to connect the first supply port 47 and the second supply port 48, and to connect the first drain port 49 and the second drain port 50. In this way, the connections and the disconnections of the ports are performed.

The opening and closing operations (functions) of the ports 47 to 51 by the operation of the spool valve 43 are explained in detail in the paragraph of the function of the embodiment.

The electromagnetic switching valve 60 is a general two port two position valve arranged to open and close the control passage 12. The electromagnetic switching valve 60 is integrally mounted on the side portion of the cylinder block which is the engine main body. The electromagnetic switching valve 60 is arranged to be brought to an ON state or an OFF state in accordance with the driving state of the engine based on ON/OFF signal (control current) from a control unit configured to control the internal combustion engine, and thereby to open and close the control passage 12.

That is, as shown in FIG. 10 to FIG. 13, this electromagnetic switching valve 60 includes a cylindrical valve body 61 which is inserted and fixed in the valve hole formed in the cylinder block; a solenoid unit 62 which is connected to a base end portion of the valve body 61, and which receives a coil and a fixed plunger and a movable plunger therein; a push rod 63 connected to a tip end side of the movable plunger, and supported to be moved within the valve body 61 in forward and rearward directions; and a ball valve element 64 arranged to open and close an open port 65a of a valve seat 65 provided within a tip end portion of the valve body 61, by the push rod 63.

The valve body 61 includes a passage hole 61a which is formed within the valve body 61 in the axial direction, and in which the push rod 63 is slid; and a tip end portion in which the valve seat 65 on which the ball valve element 64 is seated and unseated is mounted and fixed. This opening port 65a of the valve seat 65 is arranged to connect or disconnect an upstream portion 12a of the control passage 12 and the supply and discharge passage 12b on the downstream side by the seat operation and the unseat operation (the opening and closing operation) of the ball valve element 64.

Moreover, this valve body 61 includes a supply and discharge hole 61b which penetrates through the valve body 61 in the radial direction, which is formed on a circumferential wall at a side portion of the ball valve element 64, and which is arranged to connect the opening port 65a and the supply and discharge passage 12b on the downstream side of the control passage 12; a drain hole 61c which penetrates through the valve body 61 in the radial direction, which is formed on the solenoid unit 62 side, and which is arranged to be connected to the passage hole 61 through the ball valve element 64.

The coil is arranged to be energized or deenergized (applied with the current or not applied with the current) from the control unit of the engine in an ON-OFF manner.

That is, when the ON signal (the energization) is outputted from the control unit to the coil, the movable plunger is moved in the forward direction, so as to push the ball valve element 64 through the push rod 63 toward the valve seat 65. With this, the ball valve element 64 closes the opening port 65a, and connects the supply and discharge hole 61b and the passage hole 61a.

Figure 10:
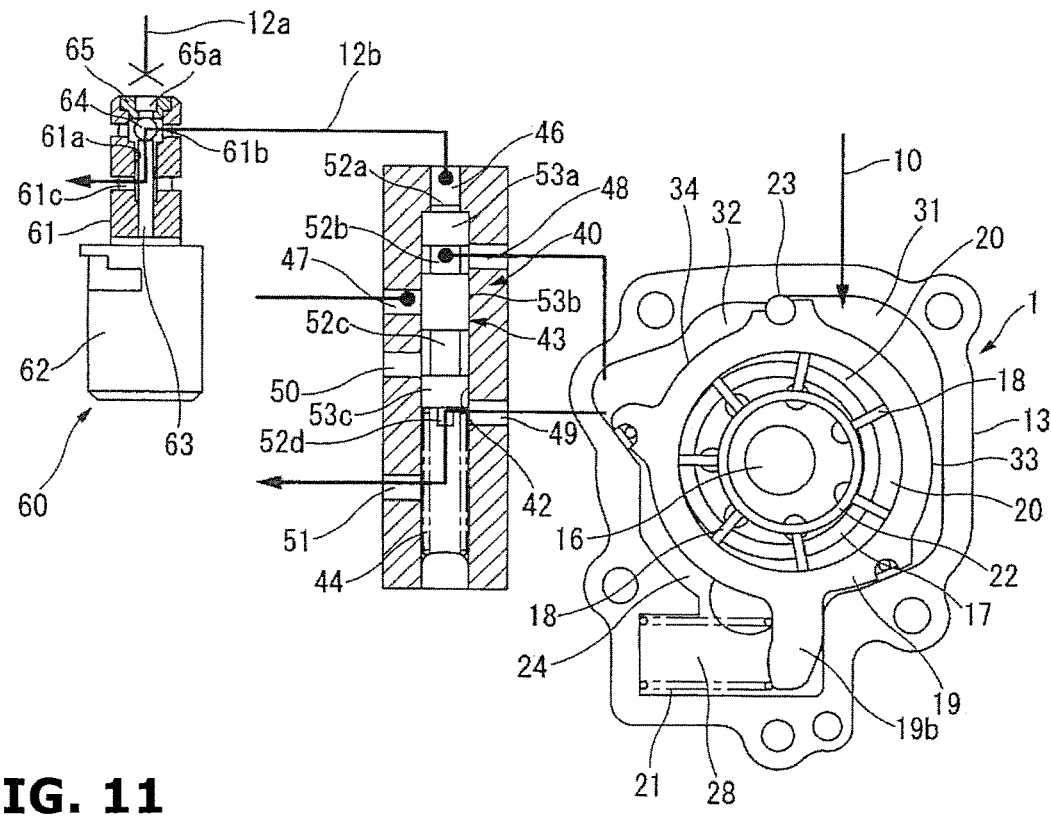
FIG. 10 is an operation explanation view of the variable displacement pump according to this embodiment.
Figure 11:
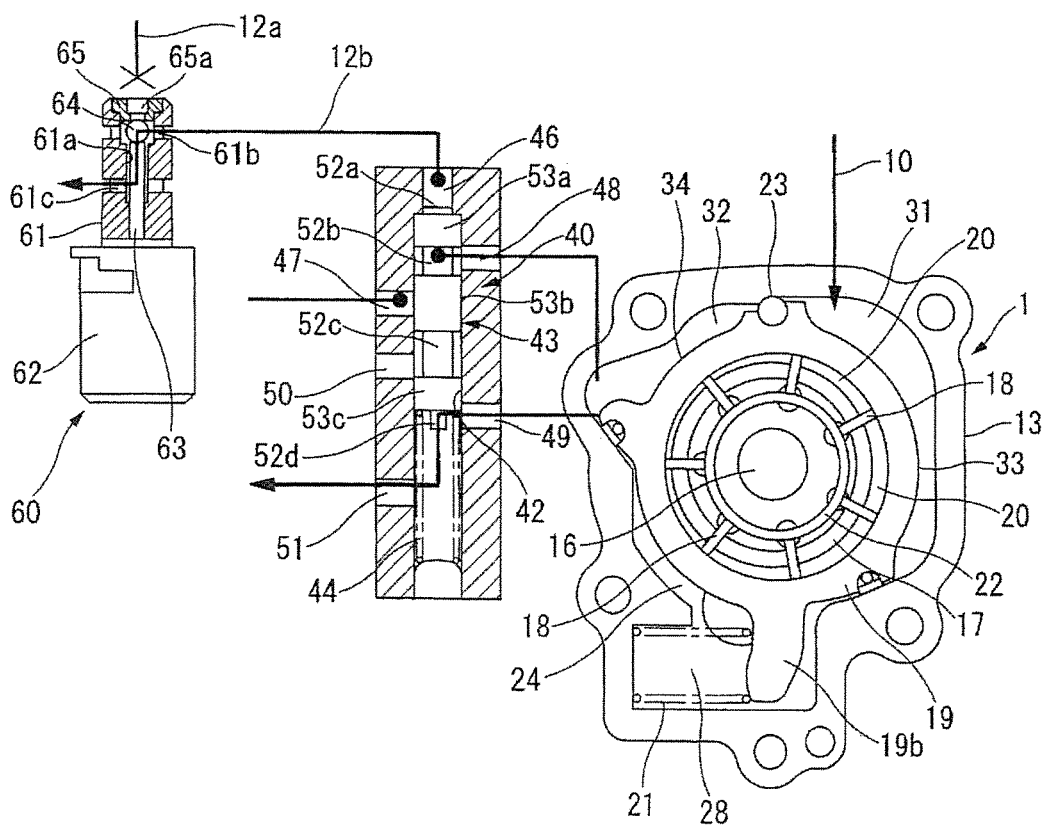
FIG. 11 is an operation explanation view of the variable displacement pump according to this embodiment.

Accordingly, the hydraulic pressure within the second control hydraulic chamber 32 is discharged from the supply and discharge passage 12b on the downstream side through the supply and discharge hole 61b, the passage hole 61a, and the drain hole 61c to the oil pan 2 (cf. FIG. 10 and FIG. 11).

On the other hand, when the OFF signal (the deenergization) is outputted to the coil, the movable plunger is moved in the rearward direction, so as to unseat the ball valve element 64 from the valve seat 65 through the push rod 63 to open the opening port 65a. With this, the upstream portion 12a of the control passage 12 and the supply and discharge passage 12b on the downstream side are connected, and the supply and discharge hole 61b and the drain hole 61c are disconnected (cf. FIG. 12 and FIG. 13).

The control unit is configured to sense a current engine driving state from an oil temperature and a water temperature of the engine, an engine speed, a load and so on, to output the ON signal (the energization) to the electromagnetic switching valve 60 when the engine speed is equal to or smaller than a predetermined speed, and to output the OFF signal (the deenergization) to the coil of the electromagnetic switching valve 60 when the engine speed is higher than the predetermined speed.

As shown in FIG. 1 and FIG. 3, the pressure regulating valve 8 includes a cylindrical valve casing 55 which is integrally provided with the cover member 14; a ball valve element 56 which is received within the valve casing 55, and which is arranged to open and close an opening end portion 58a of a bifurcated portion 58 bifurcated from an upstream portion of the discharge passage 5; a valve spring 57 which is arranged to urge the ball valve element 56 in a direction to close the opening end 58a of the bifurcated portion 58; and a plug 59 closing a lower end opening of the vale casing 55.

When the pump discharge pressure flowing through the discharge passage 5 becomes excessive in accordance with the increase of the rotation of the pump, the ball valve element 56 opens the opening end 58a of the bifurcated portion 58 to discharge the excessive discharge pressure to the outside.

[Operation of Variable Displacement Pump of First Embodiment]

Hereinafter, operations of the variable displacement pump according to the embodiment are explained with reference to FIG. 10 to FIG. 13.

When the vehicle is, for example, in the driving state of the low rotation from a start of the engine, the oil pump 1 becomes an operation state (a first state) shown in FIG. 10 and FIG. 11. In this state, the hydraulic pressure is constantly supplied to the first control hydraulic chamber 31. The control unit outputs the ON signal to the coil of the electromagnetic switching valve 60 so that the coil becomes the energization state. The ball valve element 64 is pushed in the upward direction to close the opening port 65a of the valve seat 65. Accordingly, the upstream portion 12a of the control passage 12 and the supply and discharge passage 12b are disconnected so that the supply of the control hydraulic pressure to the pilot valve 40 is stopped, and so that the supply and discharge passage 12b on the downstream side and the drain hole 61c are connected through the passage hole 61a.

On the other hand, in the pilot valve 40, the spool valve 43 is urged to a maximum uppermost position by the spring force of the valve spring 44 for the low pressure in the low engine speed. With this, the first land portion 53a is seated on the small diameter stepped portion 41a which is the seat surface. Accordingly, the first supply port 47 and the second supply port 48 are disconnected. The first drain port 49 and the third drain port 51 are connected although the second drain port 50 is closed.

Accordingly, the discharge hydraulic pressure is supplied to the first control hydraulic chamber 31. However, the hydraulic fluid within the second control hydraulic chamber 32 is discharged through the first and third drain ports 49 and 51 to the oil pan 2, so that the second control hydraulic chamber 32 is brought to the low pressure state.

Figure 4:
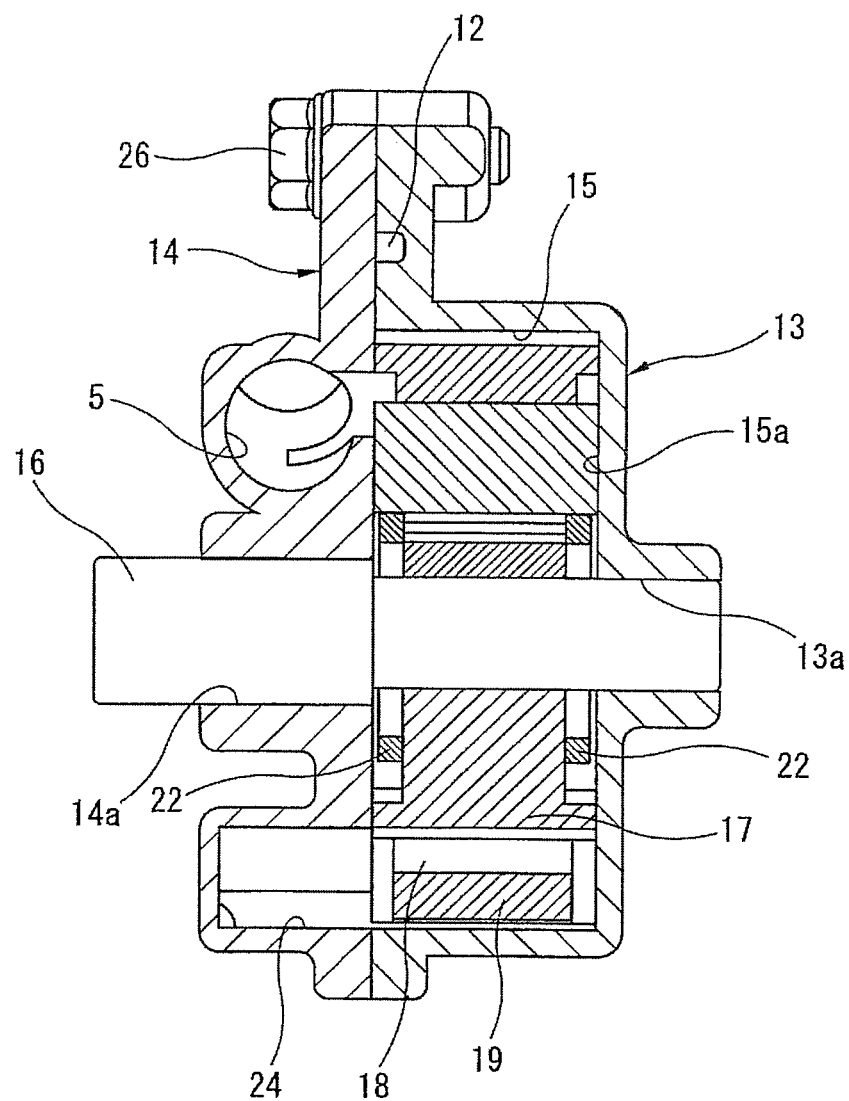
FIG. 4 is a longitudinal sectional view showing the oil pump according to this embodiment.
Figure 5:
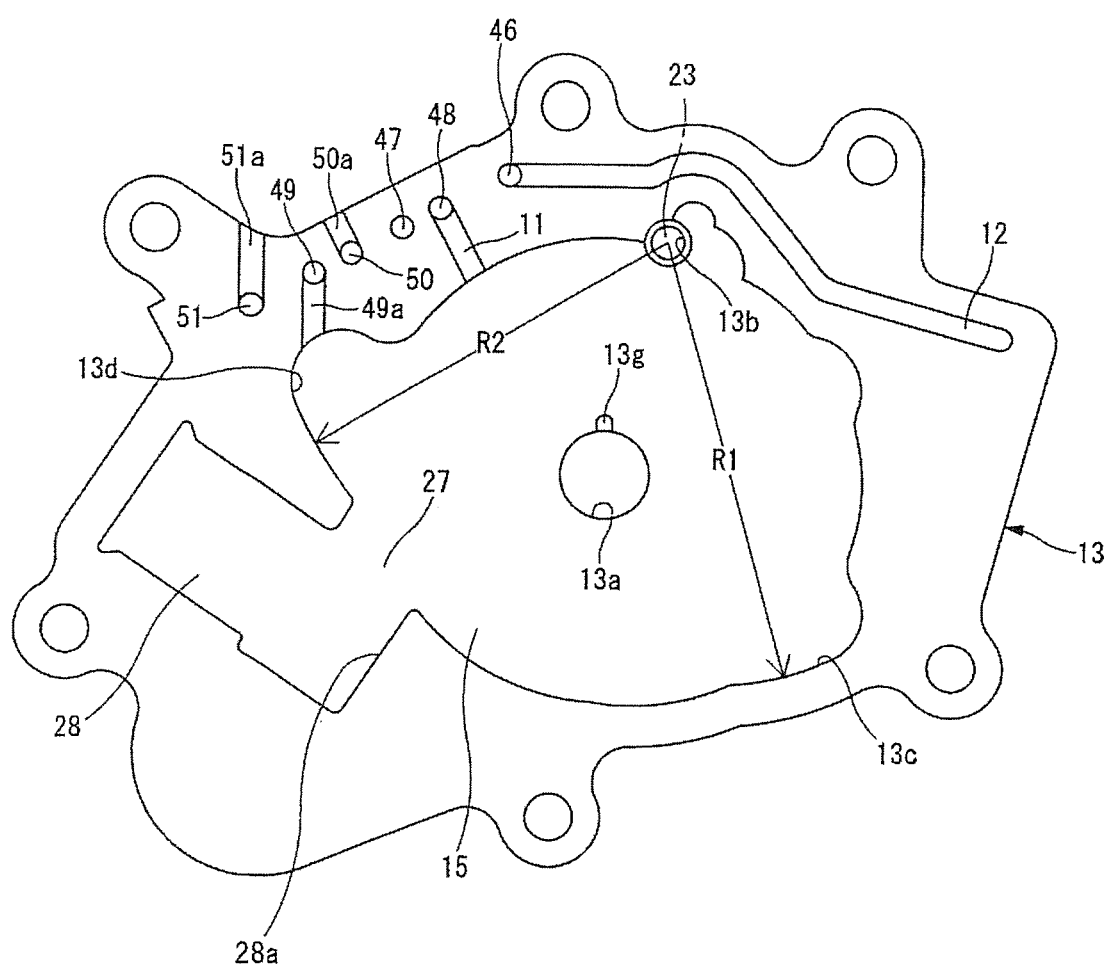
FIG. 5 is a front view showing a pump body of the oil pump according to this embodiment.

In this first state, the discharge pressure supplied to the discharge passage 5 is increased in accordance with the increase of the engine speed, so that the force in the direction in which the eccentric amount of the cam ring 19 is increased through the first pressure receiving surface 33 by the discharge pressure supplied to the first control hydraulic chamber 31. When the discharge pressure P shown in FIG. 4 reaches P1, the force acted to the cam ring 19 becomes greater than the spring force of the coil spring 21, so that the eccentric amount of the cam ring 19 becomes small to control the increase of the discharge pressure. That is, in a state where the engine speed is in states of (1) and (2) shown in FIG. 14, the discharge pressure characteristics P of the pump is controlled to be maintained to the low pressure state in which the pressure is slightly increased in accordance with the increase of the engine speed, as shown by P1 of FIG. 14.

Figure 12:
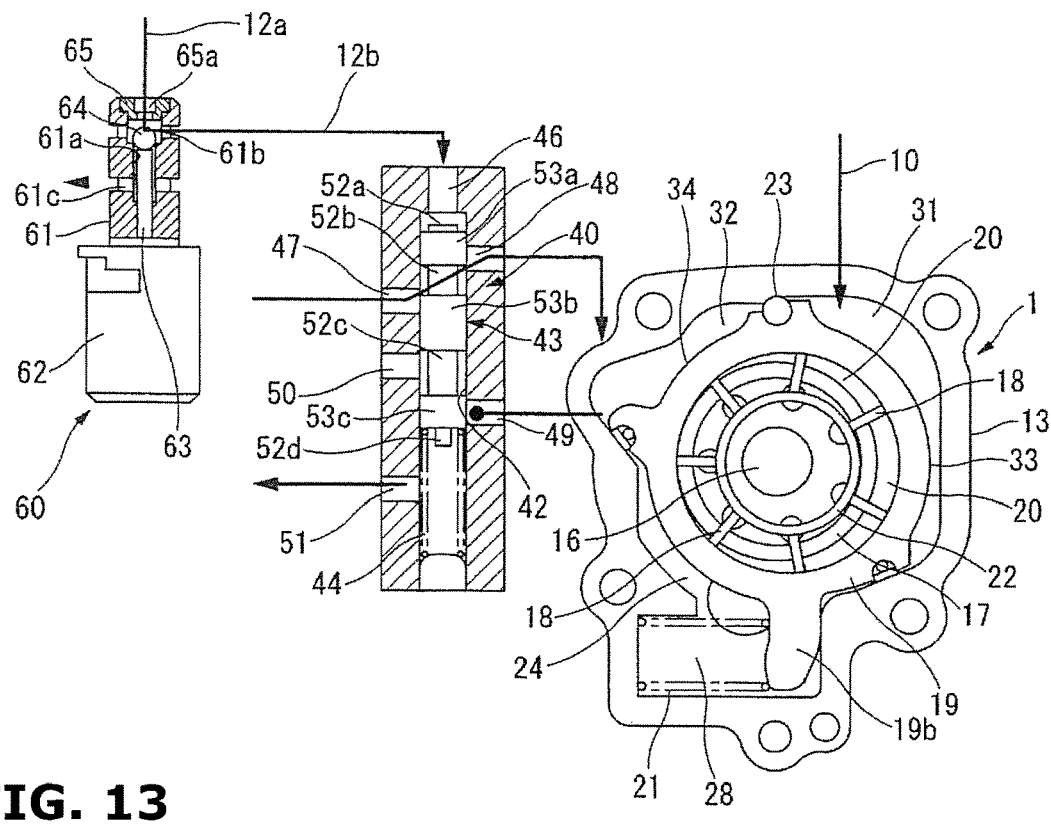
FIG. 12 is an operation explanation view of the variable displacement pump according to this embodiment.
Figure 14:
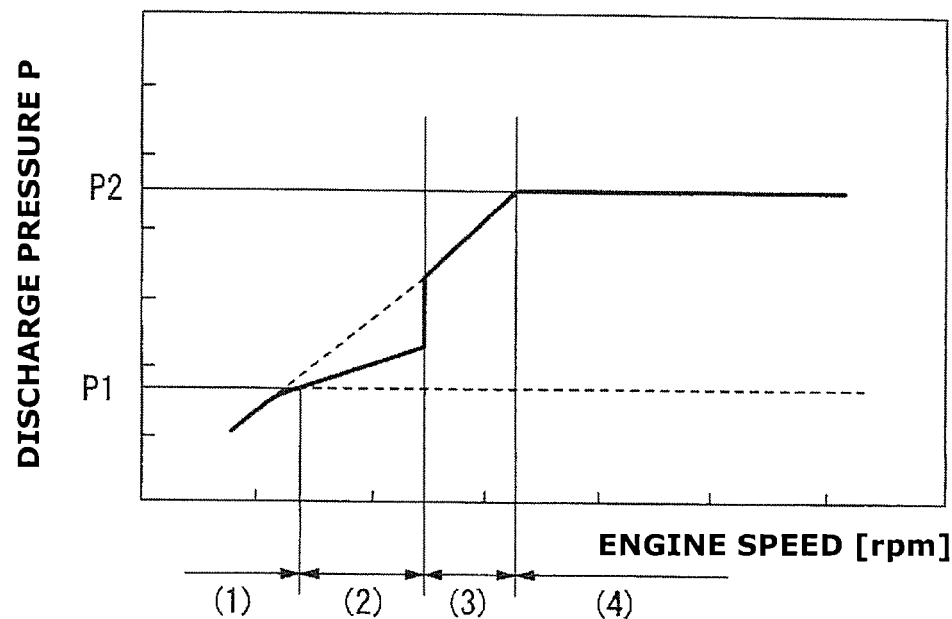
FIG. 14 is a graph showing a relationship between an engine speed and a pump discharge pressure in the variable displacement pump according to this embodiment.

Next, when the engine speed is increased to a region (3) of FIG. 14 and the load and the oil temperature are increased, so that the vehicle is brought to the driving state in which the actuation of the oil jet arranged to inject the oil to the piston is needed, the oil pump 1 becomes the second state shown in FIG. 12. That is, the control unit outputs the OFF signal (deenergization) to the electromagnetic switching valve 60. With this, as shown in FIG. 12, in the electromagnetic switching valve 60, the ball valve element 64 is separated from the valve seat 65 in accordance with the rearward movement of the push rod 63. With this, the electromagnetic switching valve 60 opens the opening port 65*a* so as to connect the upstream portion 12*a* of the control passage 12 and the supply and discharge passage 12*b* on the downstream side.

Accordingly, the hydraulic pressure of the main oil gallery 6 is acted through the control passage 12 to the upper end surface of the small diameter shaft portion 52*a* of the spool valve 43, so that the spool valve 43 is moved in the downward direction against the spring force of the valve spring 44. With this, the first supply port 47 and the second supply port 48 which are in the disconnection state by the first land portion 53*a* and the second land portion 53*b* are connected with each other through the second small diameter shaft portion 52*b*. Moreover, the third land portion 53*c* closes the first drain port 49.

Besides, the control hydraulic pressure acted to the spool valve 43 is slightly smaller than the discharge pressure of the discharge passage 5 due to the flow resistances the filter of the main oil gallery 6, and the passages.

Furthermore, either of the timing of the closing the first drain port 49 and the timing of the connection of the first and second supply ports 47 and 48 may be earlier. Moreover, these timings may be the same timing.

Accordingly, the discharge pressure of the discharge passage 5 is supplied through the first supply passage 9 to the second control hydraulic chamber 32 so as to assist the spring force of the coil spring 21, so that the cam ring 19 is slightly swung in the counterclockwise direction to be balanced with the reaction force of the cam ring 19. Consequently, the hydraulic pressure characteristics of the pump is largely controlled in a stepped manner from P1 to P2 as shown in FIG. 14.

Figure 13:
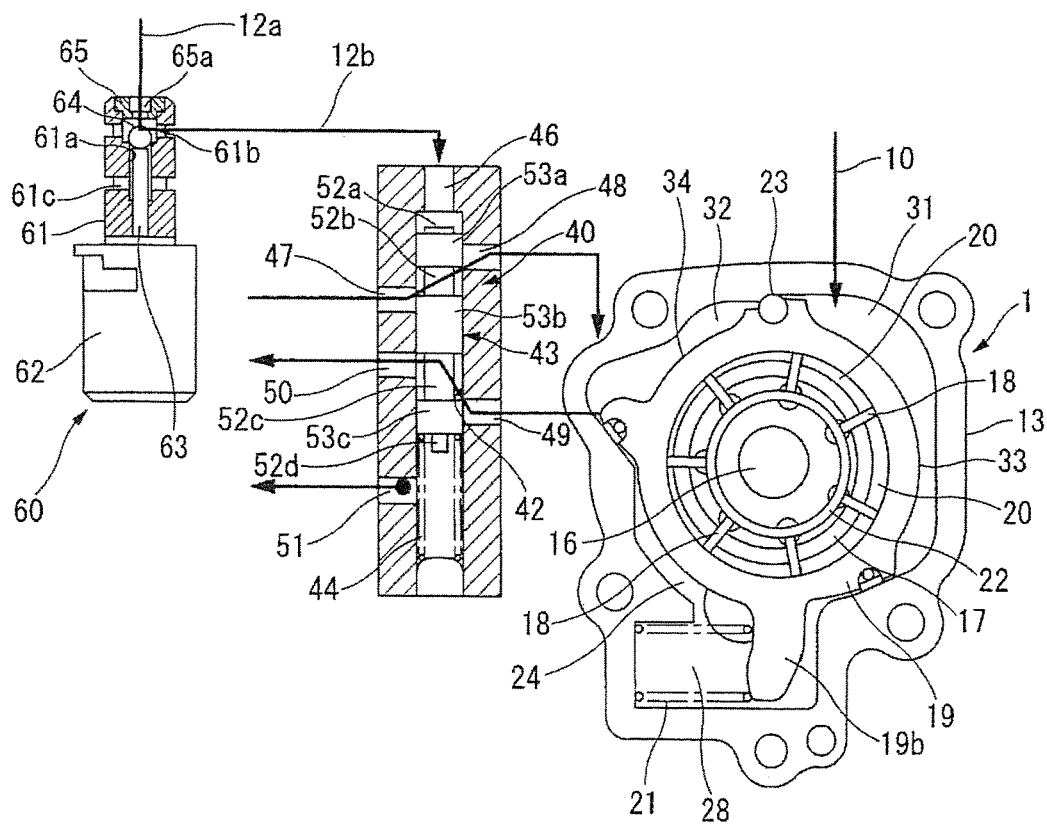
FIG. 13 is an operation explanation view of the variable displacement pump according to this embodiment.

Next, when the engine becomes the high engine speed region shown by (4) in FIG. 14, so that the engine becomes the driving state in which the higher hydraulic pressure is needed due to the high oil temperature, the oil pump 1 becomes the third state shown in FIG. 13. That is, the control unit maintains the OFF signal (the deenergization) to the electromagnetic switching valve 63. With this, the ball valve element 64 is separated from the valve seat 65 in accordance with the rearward movement of the push road 63, the opening port 65*a* is opened to maintain the connection state between the upstream portion 12*a* of the control passage 12 and the supply and discharge passage 12*b* on the downstream side.

On the other hand, as shown in FIG. 13, the control pressure acted to the upper end surface of the first small diameter shaft portion 52*a* of the spool valve 43 from the supply and discharge passage 12*b* of the control passage 12 which is the downstream side is increased in accordance with the increase of the discharge pressure. Accordingly, the spool valve 43 is further slightly moved in the downward direction. Consequently, the first and second supply ports 47 and 48 are connected in an orifice state while the first land portion 53*a* and the second land portion 53*b* throttle the opening areas of the first and second supply ports 47 and 48. Simultaneously, the first drain port 49 and the second drain port 50 are connected with each other through the second small diameter shaft portion 52*c* in the orifice state while the third land portion 53*c* throttles the opening area of the first drain port 49.

Accordingly, the discharge pressure is continuously supplied to the second control hydraulic chamber 32 through the orifices of the first and second supply ports 47 and 48. Moreover, the inside hydraulic fluid is discharged through the orifice of the drain port 49 to the outside. On the other hand, the large discharge pressure is also continuously supplied to the first control hydraulic chamber 31. Accordingly, the cam ring 19 is slightly moved against the spring force of the coil spring 21 in the clockwise direction in which the eccentric amount becomes small.

Consequently, the pump discharge pressure is temporarily decreased. However, the control hydraulic pressure acted to the spool valve 43 is also decreased in accordance with the decrease of the pump discharge pressure. Accordingly, the spool valve 43 is again moved in the upward direction to supply the discharge pressure to the second control hydraulic chamber 32. That is, when the pump discharge pressure is in the state of P2, the discharge pressure is repeated to be increased and decreased in accordance with the upward and downward movements of the spool valve 43, and then regulated to the constant pressure.

In this way, in this embodiment, the actuation of the pilot valve 40 is controlled through the electromagnetic switching valve 60. With this, it is possible to control the pump discharge pressure to P1 and P2 in the two stage manner. Moreover, even when the electromagnetic switching valve 60 is provided to the cylinder block which is the engine main body, the only single control passage 12 is merely formed in the engine main body. Accordingly, it is possible to simplify the piping structure, and thereby to improve the manufacturing operation efficiency and to decrease the manufacturing cost.

Furthermore, in the third state, it is possible to control the pump discharge pressure to the highest pump discharge pressure in this embodiment. The third state is often used in the high engine speed driving state of the engine. In this case, it is possible to suppress the variation of the pump discharge pressure due to the swing movement of the cam ring 19 by the unintended hydraulic pressure by losing the hydraulic balance radially inside the cam ring 19 by the cavitation and the mixture of the air into the oil within the oil pan 2.

Besides, the control unit energizes the electromagnetic switching valve 60 in the engine low speed region (the discharge pressure P1). On the other hand, the control unit deenergizes the electromagnetic switching valve 60 at the high engine speed (the discharge pressure P2). Accordingly, for example, even when the harnesses and the coil of the electromagnetic switching valve 60 are broken, it is possible to perform the pump discharge pressure control at the high engine speed (P2). Moreover, it is possible to conversely set the energization and the deenergization in accordance with the energy saving.

Second Embodiment

Figure 15:
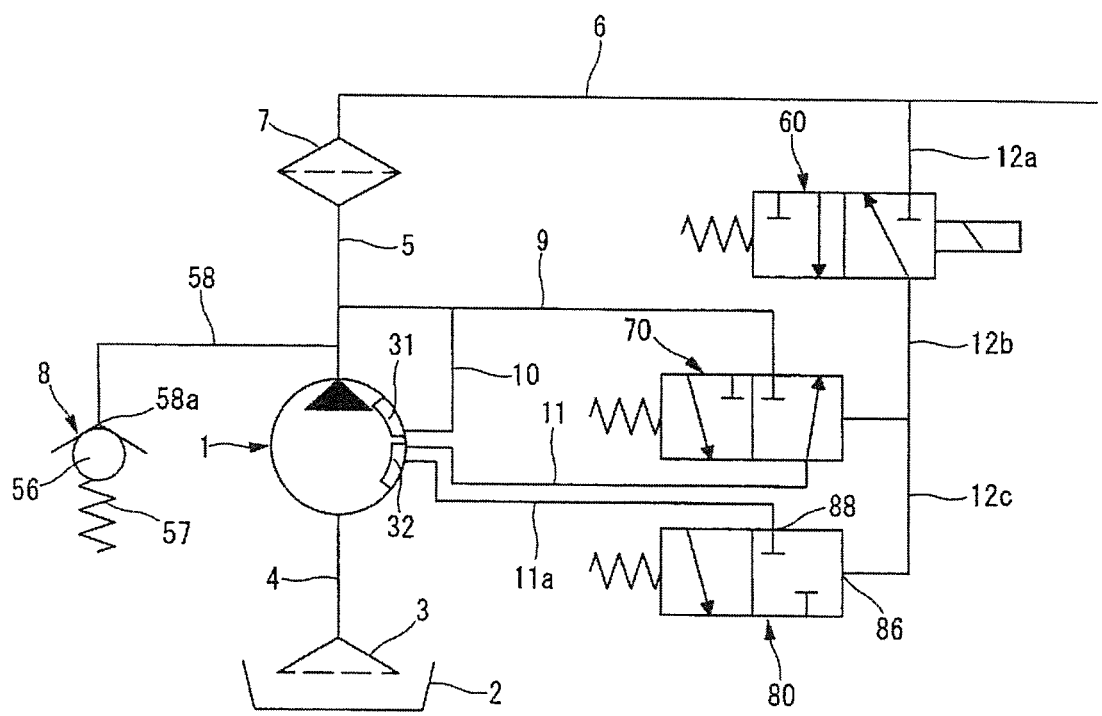
FIG. 15 is a schematic view showing a hydraulic circuit and an oil pump of a variable displacement pump according to a second embodiment of the present invention.

FIG. 15 shows a second embodiment according to the present invention. The structure of the oil pump 1, the structure in which the first control hydraulic chamber 31 is directly connected to the second supply passage 10 to constantly receive the pump discharge pressure, and the structure of the electromagnetic switching valve 60 are identical to those of the first embodiment. In the second embodiment, the pilot valve includes two pilot valves including a first pilot valve 70 which is a first control mechanism, and a second pilot valve 80 which is a second control mechanism, unlike the first embodiment.

Figure 16:
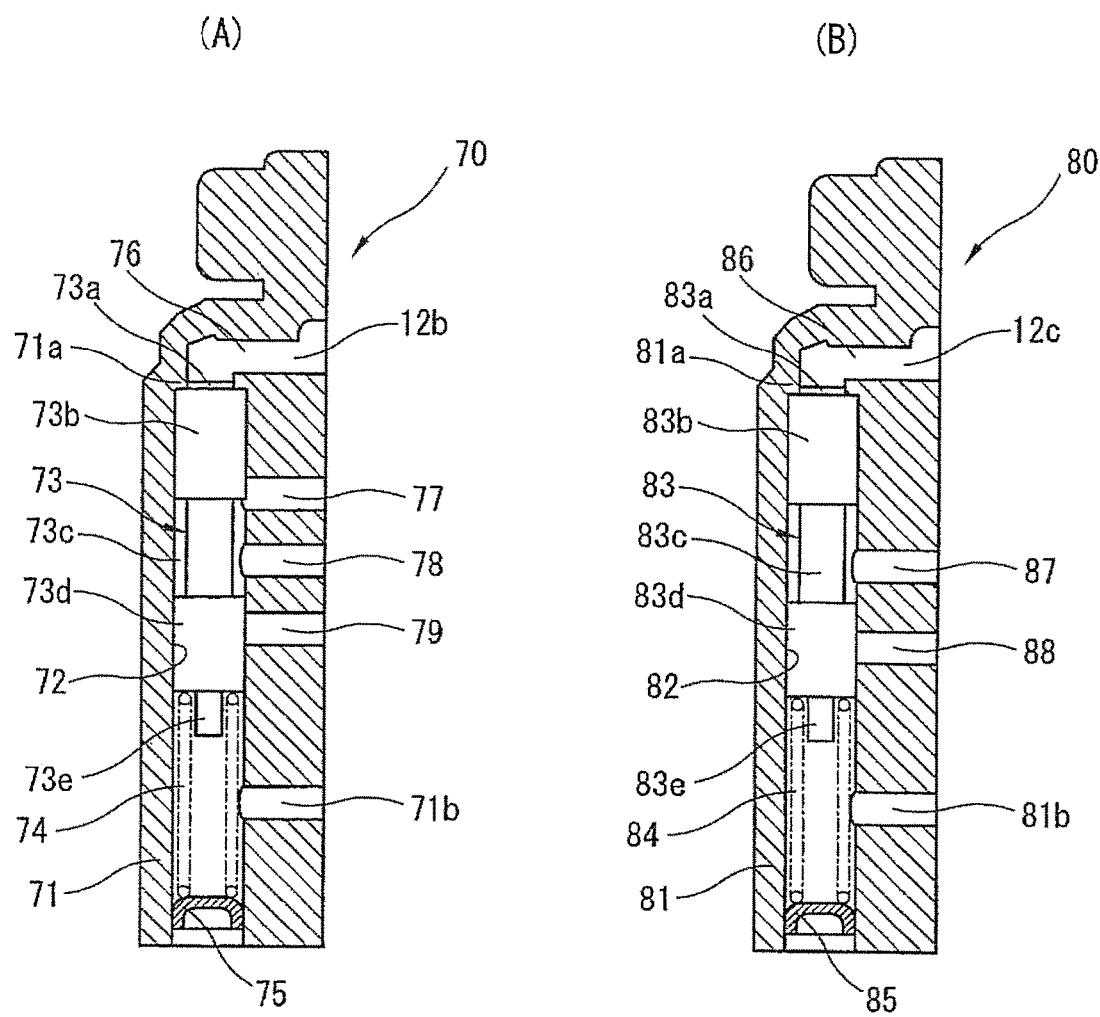
FIG. 16 are longitudinal sectional views showing a pilot valve in this embodiment.

That is, as shown in FIG. 16A, the first pilot valve 70 includes a first valve body 71 which has a cylindrical shape, which is mounted to the cover member 14, and which includes a first sliding hole 72 formed within the first valve body 71; a first spool valve 73 slidably received within the first sliding hole 72; and a first valve spring 74 elastically mounted at a lower portion of the first sliding hole 72, and arranged to urge the first spool valve 73 in the upward direction. Moreover, a plug 75 is fixed in a lower opening of the first sliding opening 72 by the press fit. The plug 75 closes the opening.

The first valve body 71 includes a first pilot pressure introduction port 76 which is provided at an upper end portion of the first valve body 71, which penetrates through the first valve body 71 in the radial direction, and which is connected to the supply and discharge passage 12b of the control passage 12 which is the downstream side. Moreover, the first valve body 71 includes a connection port 77, a supply and discharge port 78, a supply port 79, and an air vent hole 71b which are formed in a circumferential wall in this order from the upper side, and which penetrate through the first valve body 71 in the radial directions. The connection port 77 is connected to the atmospheric pressure. The supply and discharge port 78 is connected to the second control hydraulic chamber 32. The supply port 79 is connected to the first supply passage 9. The air vent hole 71b is arranged to ensure the good slidability of the first spool valve 73.

The first spool valve 73 includes a first small diameter shaft portion 73a, a first land portion 73b, a second small diameter portion 73c, a second land portion 73d, and a third small diameter portion 73e which are formed in this order from the upper side. The first small diameter shaft portion 73a receives the hydraulic pressure of the first pilot pressure introduction portion 76. The third small diameter shaft portion 73e is positioned at a lowermost position.

As shown in FIG. 16B, the second pilot valve 80 includes a second valve body 81 which has a cylindrical shape, which includes a second sliding hole 82 formed within the second valve body 81, and which is mounted to the cover member 4; a second spool valve 83 slidably received within the second sliding hole 82; and a second valve spring 84 elastically mounted at a lower portion of the second sliding hole 82, and arranged to urge the second spool valve 83 in the upward direction. Moreover, a plug 85 is fixed in a lower opening of the second sliding opening 82 by the press fit. The plug 85 closes the opening.

The second valve body 81 includes a second pilot pressure introduction port 86 provided at an upper end portion of the second valve body 81, which penetrates through the second valve body 81 in the radial direction, and connected to a second supply and discharge passage 12c bifurcated from the supply and discharge passage 12b of the control passage 12 which is the downstream side. Moreover, the second valve body 81 includes a first drain port 87, a second drain port 88, and an air vent hole 81b which are formed in a circumferential wall in this order from the upper side, and which penetrate through the second valve body 81 in the radial directions. The first drain port 87a is connected through 11a to the second control hydraulic chamber 32. The second drain port 88 is arranged to be relatively connected to the first drain port and the atmospheric pressure. The air vent hole 81b is arranged to ensure the good slidability of the second spool valve 83.

The second spool valve 83 includes a first small diameter shat portion 83a, a first land portion 83b, a second small diameter portion 83c, a second land portion 83d, and a third small diameter shaft portion 83e which are formed in this order from the upper side of FIG. 16B.

[Operations and Effects in Second Embodiment]

Hereinafter, operations in the variable displacement pump according to the second embodiment are explained with reference to FIG. 17 to FIG. 20.

Figure 17:
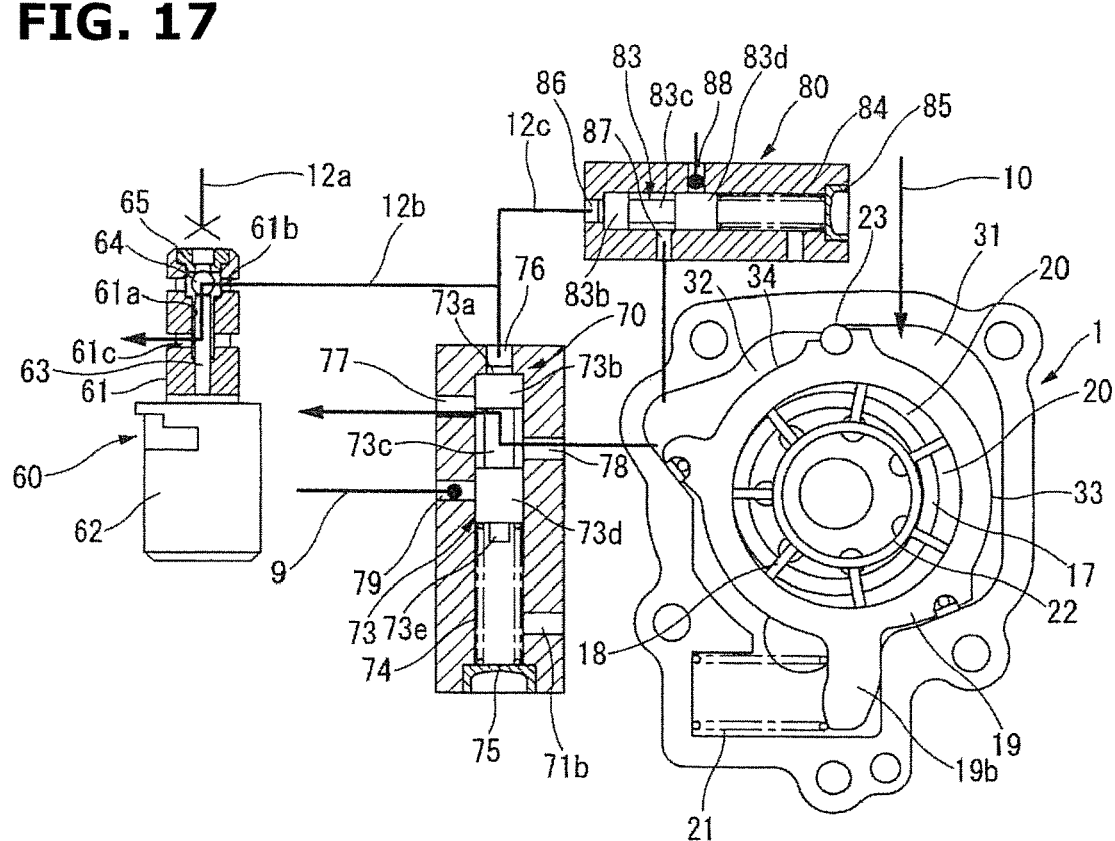
FIG. 17 is an operation explanation view of the variable displacement pump according to this embodiment.
Figure 18:
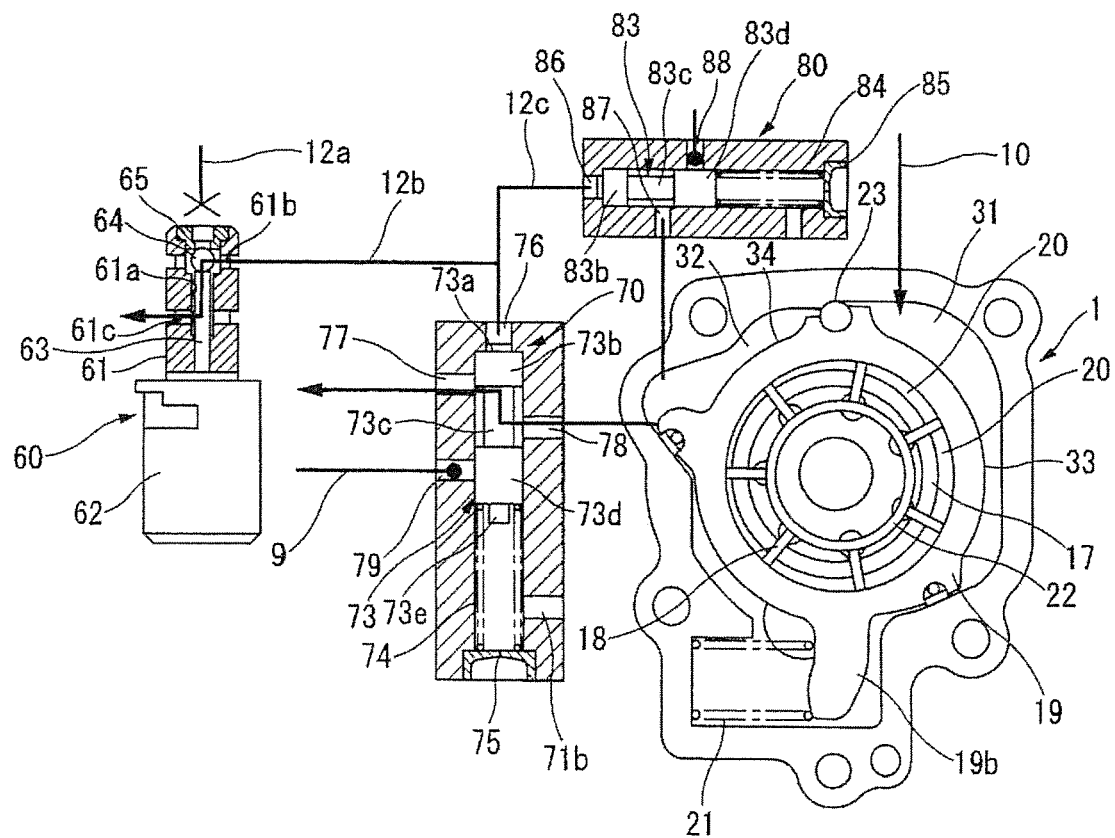
FIG. 18 is an operation explanation view of the variable displacement pump according to this embodiment.

When the vehicle is, for example, in the driving state of the low rotation from the start of the engine, the oil pump 1 becomes the first state shown in FIG. 17 and FIG. 18. In this first state, the hydraulic pressure is constantly supplied to the first control hydraulic chamber 31. The control unit outputs the ON signal to the coil of the electromagnetic switching valve 60 so that the coil becomes the energization state. The upstream portion 12a of the control passage 12 and the supply and discharge passage 12b on the downstream side are disconnected so as to stop the supply of the control hydraulic pressure to the first and second pilot valves 70 and 80.

As show in FIG. 16A, FIG. 17, and FIG. 18, in the pilot valve 40 in the first state, the first spool valve 73 is urged to the uppermost position by the spring force of the valve spring 74, so that the first small diameter shaft portion 73a is seated on the small diameter stepped portion 71a which is the seat surface, for the low engine speed and the low hydraulic pressure. Accordingly, the supply and discharge port 78 and the connection port 77 are connected by the second small diameter shaft portion 73c, and the supply port 79 is closed by the second land portion 73d.

Consequently, the hydraulic fluid within the second control hydraulic chamber 32 is discharged through the supply and discharge port 78 and the connection port 77 to the outside, that is, the oil pan 2, so that the second control hydraulic chamber 32 becomes the low pressure state.

On the other hand, as shown in FIG. 16B, FIG. 17, and FIG. 18, in the second pilot valve 80, the second spool valve 83 is urged to the uppermost position by the spring force of the valve spring 84, so that the first small diameter shaft portion 83a is seated on the small diameter stepped portion 81a which is the seat surface. In this state, the second drain port 88 is closed by the second land portion 83d to disconnect the second drain port 88 and the first drain port 87.

In this first state, the discharge pressure supplied to the discharge passage 5 is increased in accordance with the increase of the engine rotation, so that the force in the direction where the eccentric amount of the cam ring 19 is decreased is increased by the discharge pressure supplied to the first control hydraulic chamber 31.

That is, when the discharge pressure P shown in FIG. 14 reaches P1, the force acted to the cam ring 19 become greater than the spring force of the coil spring 21, so that the eccentric amount of the cam ring 19 becomes small to control the increase of the discharge pressure, like the first embodiment. That is, in the state where the engine speed shown in FIG. 14 is (1) and (2), the discharge pressure characteristics P of the pump is controlled to be maintained to the low pressure state in which the pressure is started to be increased in accordance with the increase of the engine speed, as shown by P1 in FIG. 14. This is the state identical to that of the first embodiment.

Figure 19:
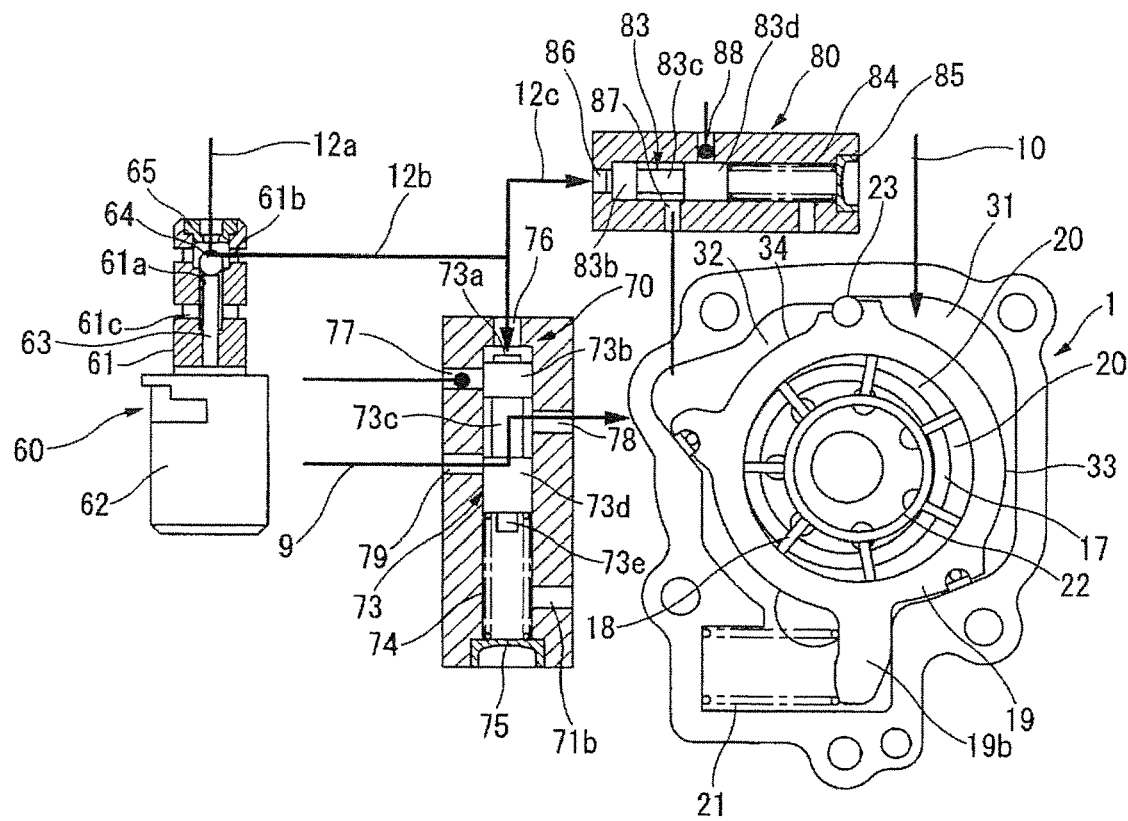
FIG. 19 is an operation explanation view of the variable displacement pump according to this embodiment.

Next, when the engine speed is increased to be the region (3) in FIG. 14, the oil pump 1 becomes the second state shown in FIG. 19. That is, the OFF signal (the deenergization) is outputted to the electromagnetic switching valve 60, the ball valve element 64 is separated from the valve seat 65 in accordance with the rearward movement of the push rod 63, so that the electromagnetic switching valve 60 opens the opening port 65a so as to connect the upstream portion 12a of the control passage 12, and the supply and discharge passage 12b and the second supply and discharge passage 12c of the control passage 12 which are on the downstream side.

Accordingly, the hydraulic pressure of the main oil gallery 6 is acted on the upper end surfaces of the first small diameter shaft portions 73a and 83a of the spool valves 73 and 83 through the control passage 12, so that the spool valves 73 and 83 are moved in the downward direction against the valve springs 74 and 84. With this, in the first pilot valve 70, the connection port 77 is closed by the first land portion 73b, and the supply port 79 and the supply and discharge port 78 are connected by the second small diameter portion 73c.

Consequently, the discharge pressure of the discharge passage 5 is supplied through the first supply passage 9 to the second control hydraulic chamber 32, so that the cam ring 19 is swung in the counterclockwise direction. Therefore, the hydraulic pressure characteristic of the pump is largely controlled from P1 to P2 in the stepped manner, as shown in FIG. 14.

On the other hand, the second pilot valve 80 is continued to be the state in which the second land portion 83d closes the second drain port 88 at this time.

Figure 20:
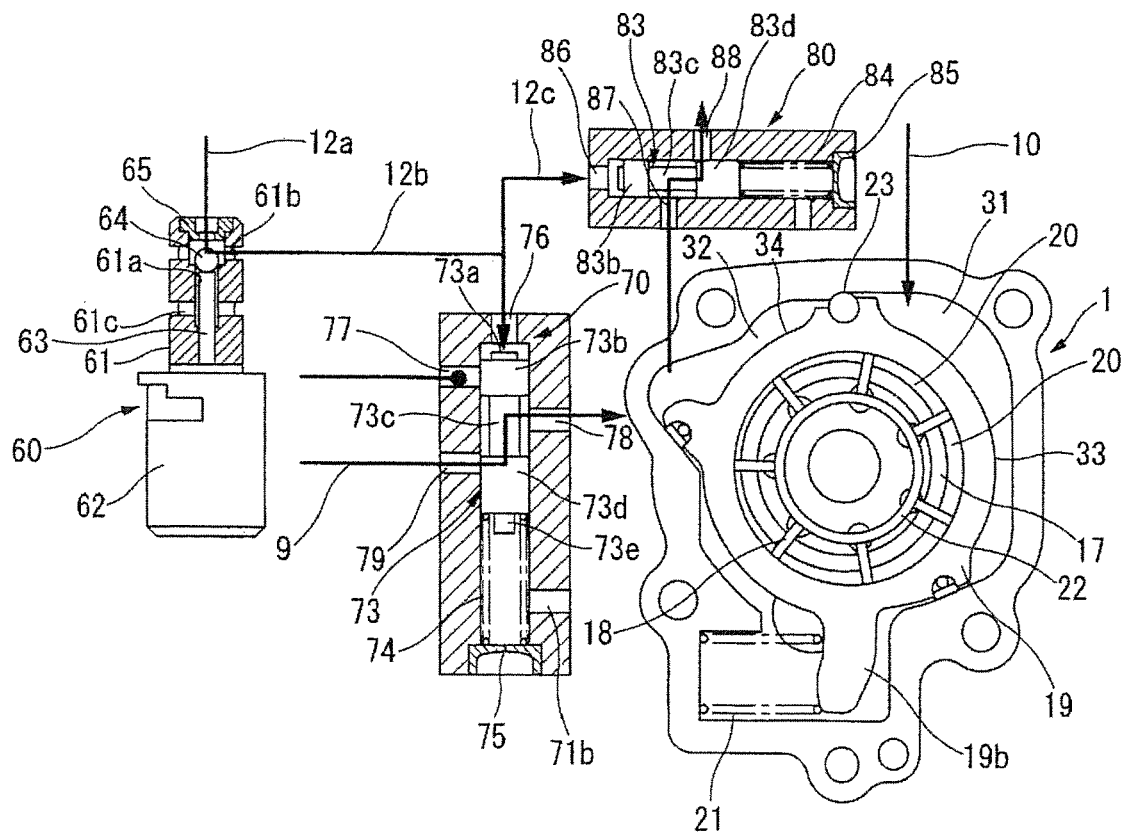
FIG. 20 is an operation explanation view of the variable displacement pump according to this embodiment.

Next, when the engine becomes the high engine speed region shown by (4) in FIG. 14, the oil pump 1 becomes the third state shown in FIG. 20. That is, the OFF signal (the deenergization) is maintained to the electromagnetic switching valve 60. The ball valve element 64 is separated from the valve seat 65 in accordance with the rearward movement of the push rod 63, so that the opening port 65a is opened so as to maintain the connection state of the upstream portion 12a of the control passage 12, and the supply and discharge passage 12b and the second supply and discharge passage 12c of the control passage 12 which are on the downstream side.

In this case, as shown in FIG. 20, in the first and second pilot valves 70 and 80, the control hydraulic pressure acted from the supply and discharge passage 12b of the control passage 12 which is on the downstream side to the upper end surfaces of the small diameter shaft portions 73a and 83a of the first and second spool valves 73 and 83 becomes large, so that the spool valves 73 and 83 are further moved in the downward direction. In the first pilot valve 70, the second land portion 73d throttles the opening area of the supply port 79 to form the orifice (throttle), and the supply port 79 and the supply and discharge port 78 are connected through the second small diameter portion 73c. Accordingly, the discharge pressure from the first supply passage 9 is supplied through the orifice of the supply port 79 to the second control hydraulic chamber 32.

On the other hand, in the second pilot valve 80, the first drain port 87 and the second drain port 88 are connected by the second small diameter shaft portion 83c. The opening area of the second drain port 88 is throttled by the second land portion 83d to be brought to the orifice state. Accordingly, the hydraulic fluid within the second control hydraulic chamber 32 is throttled and discharged into the oil pan 2. By these supply and discharge function, the hydraulic pressure within the second control hydraulic chamber 32 is regulated, so that the discharge pressure P2 is controlled to be a substantially constant value, as shown in FIG. 14.

In this embodiment, the control passage 12 is single within the engine main body, like the first embodiment. Accordingly, it is possible to obtain the functions and the effects such as the simplification of the piping structure. Moreover, there are two pilot valves of the first and second pilot valves 70 and 80. Consequently, it is possible to set the spring loads and the spring constants of the first valve spring 74 and the second valve spring 84 independently. Therefore, it is possible to readily set the springs, relative to the single spring in the first embodiment.

Third Embodiment

Figure 21:
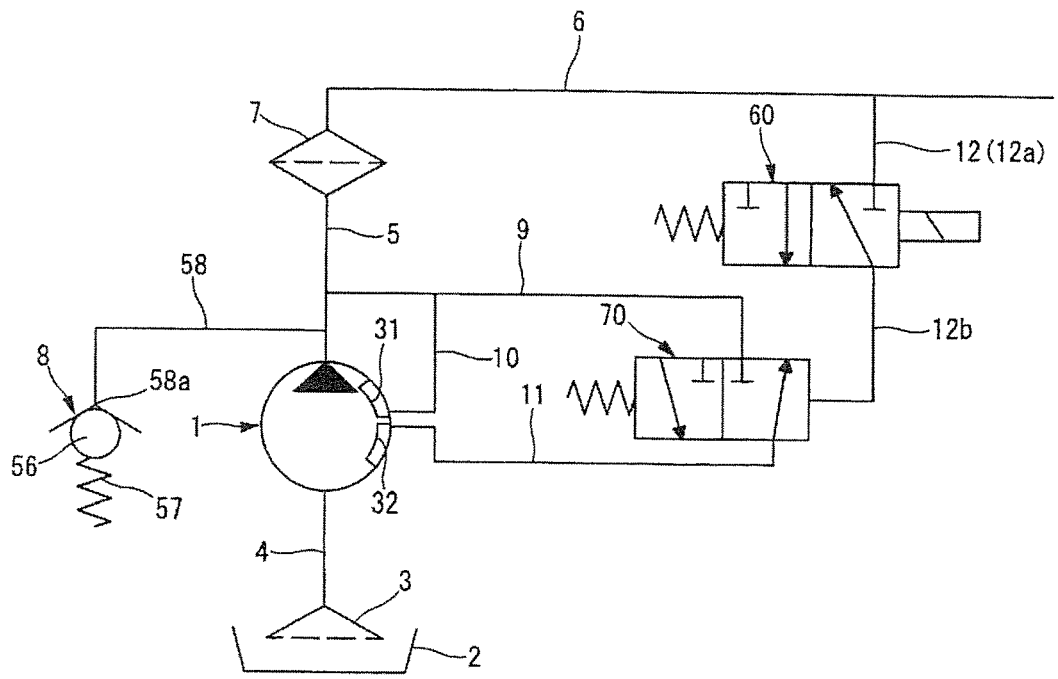
FIG. 21 is a schematic view showing a hydraulic circuit and an oil pump of a variable displacement pump according to a third embodiment of the present invention.

FIG. 21 shows a third embodiment. The second pilot valve 80 in the second embodiment is omitted. The only first pilot valve 70 is provided.

Figure 22:
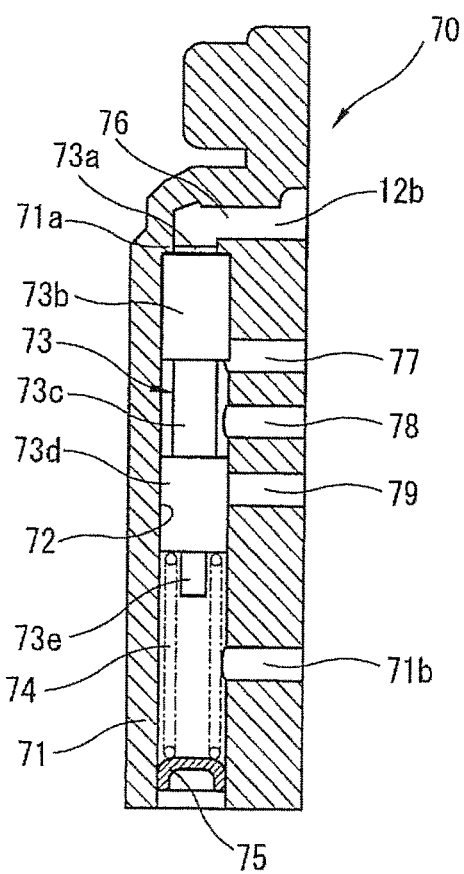
FIG. 22 is a longitudinal sectional view showing a pilot valve in this embodiment.

As shown in FIG. 22, this pilot valve 70 has the structure identical to that of the second pilot valve 80 in the second embodiment. The pilot valve 70 includes a cylindrical valve body 71 mounted to the cover member 14, a sliding hole 72, a spool valve 73, a valve spring 74, and a plug 75.

The valve body 71 includes a pilot pressure introduction port 76, a connection port 77, a supply and discharge port 78, a supply port 79, and an air vent hole 71b which penetrate through the valve body 71 in the radial directions.

The spool valve 73 includes a first small diameter shaft portion 73a, a first land portion 73b, a second small diameter shaft portion 73c, a second land portion 73d, and a third small diameter shaft portion 73e which is positioned at a lowermost position.

[Operations and Effects in Third Embodiment]

Figure 23:
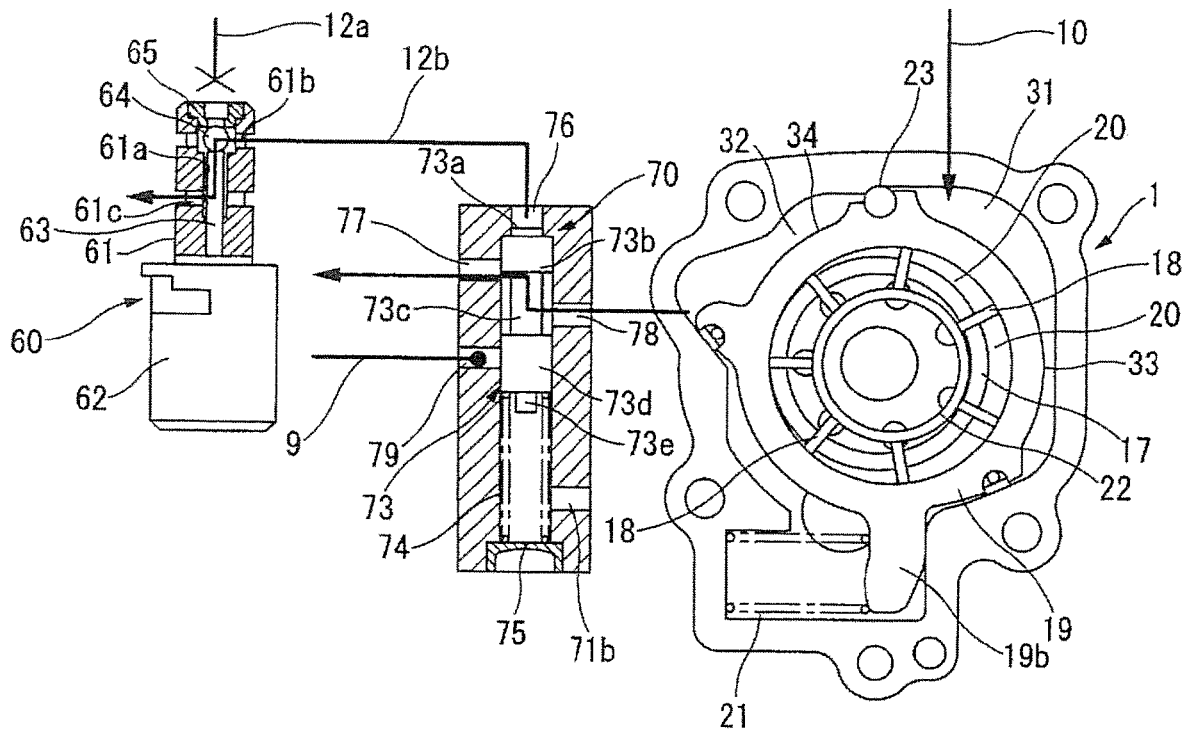
FIG. 23 is an operation explanation view of the variable displacement pump according to this embodiment.
Figure 24:
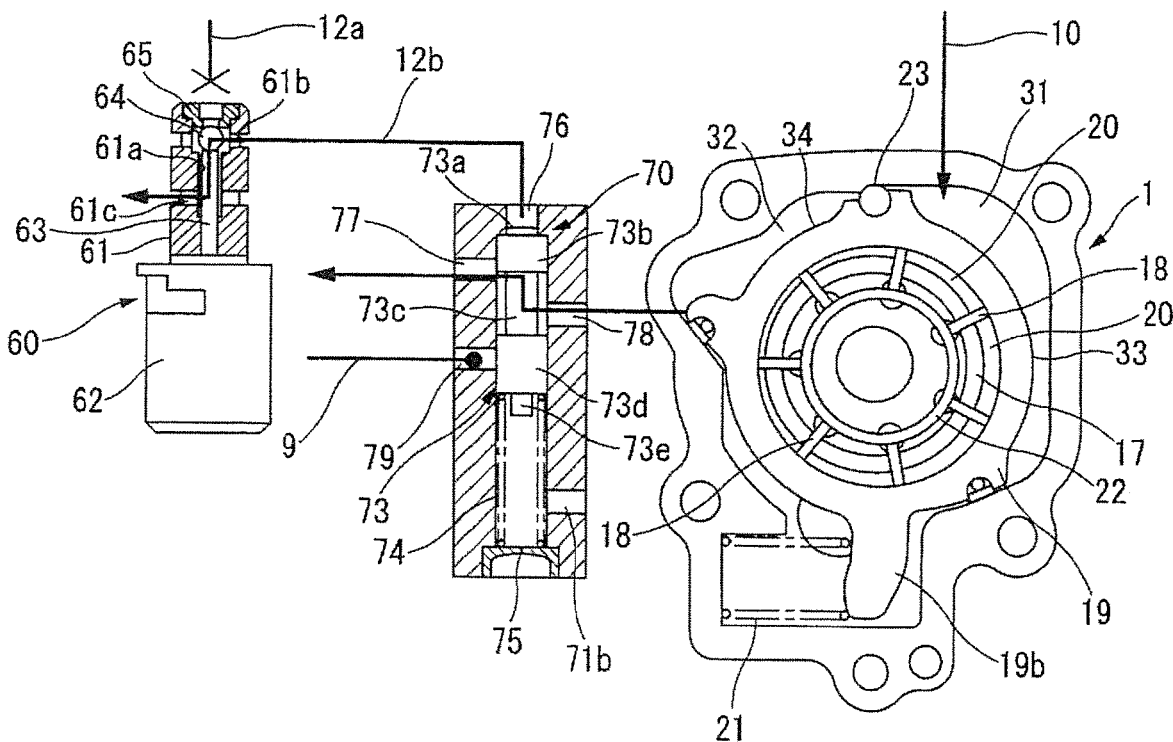
FIG. 24 is an operation explanation view of the variable displacement pump according to this embodiment.
Figure 27:
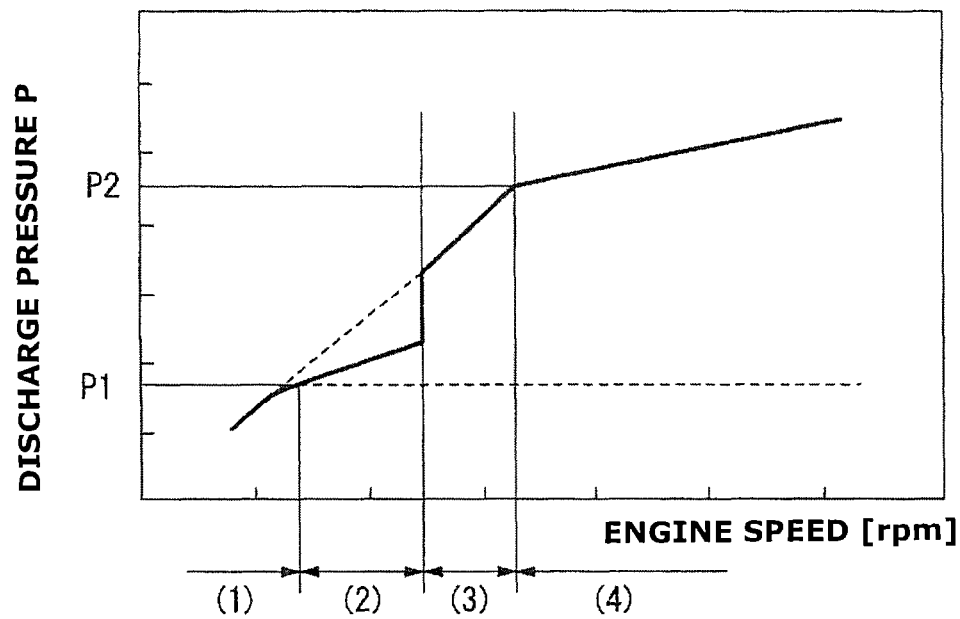
FIG. 27 is a graph showing a relationship between an engine speed and a pump discharge pressure in the variable displacement pump according to this embodiment.

Accordingly, in the low rotation region (regions (1) and (2) of FIG. 27) from the engine start, the oil pump 1 becomes a first state shown in FIG. 23 and FIG. 24. That is, the spool valve 73 is urged to the uppermost position by the spring force of the valve spring 74, so that the first small diameter shaft portion 73a is seated on the small diameter stepped portion 71a which is the seat surface, like the states shown in FIG. 17 and FIG. 18 in the second embodiment. Consequently, the supply port 78 and the connection port 77 are connected by the second small diameter shaft portion 73c. Moreover, the supply port 79 is closed by the second land portion 73d.

Accordingly, the hydraulic fluid within the second control hydraulic chamber 32 is discharged through the supply and discharge port 78 and the connection port 77 to the oil pan 2, so that the second control hydraulic chamber 32 becomes the low pressure state.

In this first state, as shown in FIG. 27, when the discharge pressure P reaches P1, the force acted to the cam ring 19 becomes greater than the spring force of the coil spring 21, so that the eccentric amount of the cam ring 19 becomes small to control the increase of the discharge pressure. That is, the discharge pressure characteristics P of the pump is controlled to be maintained to the low pressure state in which the pressure is started to be increased in accordance with the increase of the engine speed, as shown by P1 of FIG. 27. This is identical to those in the first and second embodiments.

Figure 25:
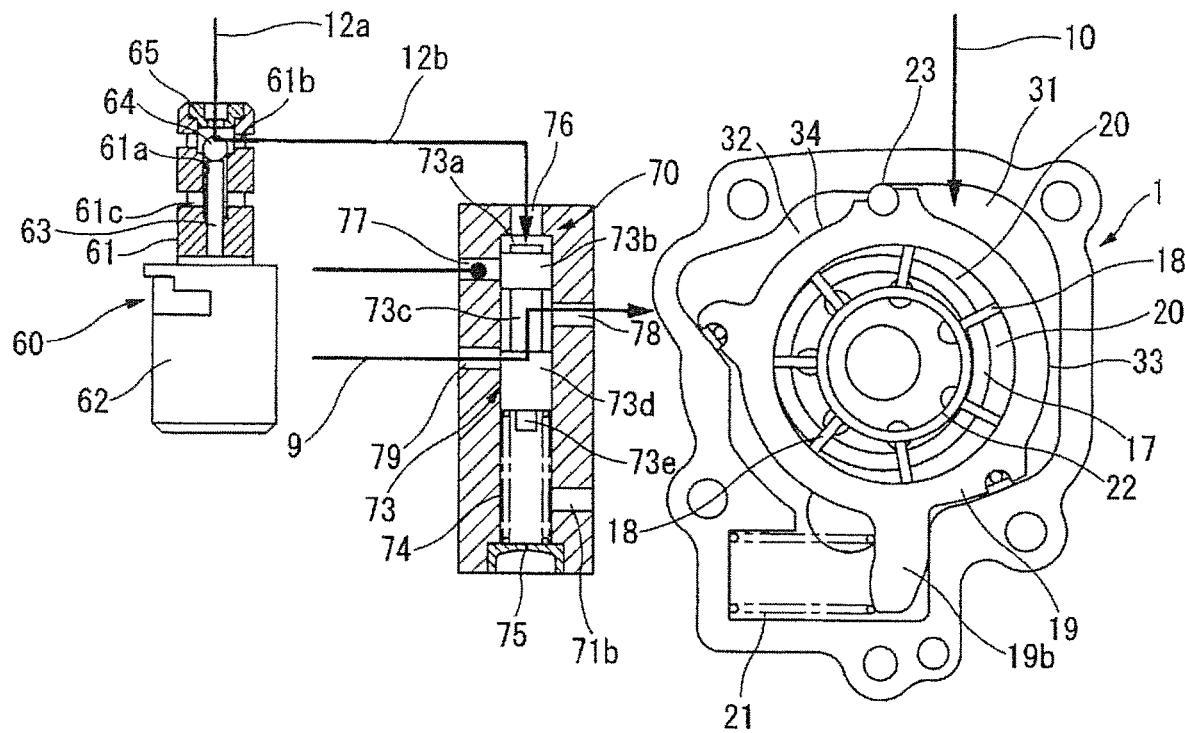
FIG. 25 is an operation explanation view of the variable displacement pump according to this embodiment.
Figure 26:
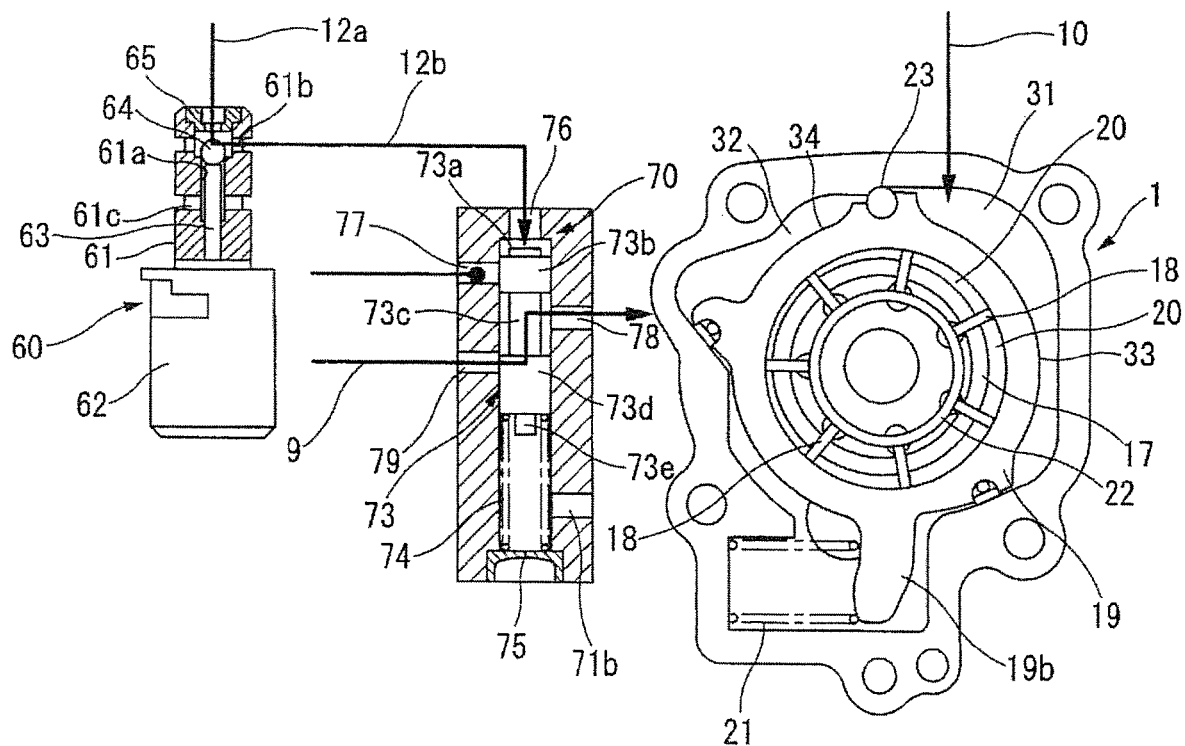
FIG. 26 is an operation explanation view of the variable displacement pump according to this embodiment.

When the engine rotation is increased to be regions (3) and (4) in FIG. 27, the oil pump 1 becomes second and third states shown in FIG. 25 and FIG. 26. In the electromagnetic switching valve 60 to which the OFF signal is outputted, the ball valve element 64 is separated from the valve seat 65 in accordance with the rearward movement of the push rod 63, so that the opening port 65a is opened to connect the upstream portion 12a of the control passage 12 and the supply and discharge passage 12b which is the downstream side. Accordingly, the hydraulic pressure of the main oil gallery 6 is acted to the upper end surface of the small diameter shaft portion 73a of the spool valve 73, so that the spool valve 73 is moved in the downward direction against the spring force of the valve spring 74.

With this, in the pilot valve 70, the connection port is closed by the first land portion 73b, and the supply port 79 and the supply and discharge port 78 are connected by the second small diameter shaft portion 73c.

Accordingly, the discharge pressure is supplied through the supply port 79 to the second control hydraulic chamber 32. Consequently, the cam ring 19 is swung in the clockwise direction or in the counterclockwise direction by the above-described pressure and the difference of the pressure receiving areas of the first and second pressure receiving surfaces 33 and 34 of the cam ring 19 which confront the first control hydraulic chamber 31 and the second control hydraulic chamber 32, so as to increase or decrease the eccentric amount. The discharge pressure P shown in FIG. 27 becomes the characteristics in which the pressure is slightly increased from the P2 in accordance with the increase of the engine speed.

As described above, in this embodiment, even when the electromagnetic switching valve 60 is provided to the engine main body, it is possible to provide the single control passage 12. Consequently, it is possible to simplify the pipe and so on like the above-described embodiments. Moreover, in this embodiment, the second pilot valve is omitted. With this, it is possible to decrease the size and the weight of the oil pump 1, and to decrease the cost, relative to the second embodiment.

Fourth Embodiment

Figure 28:
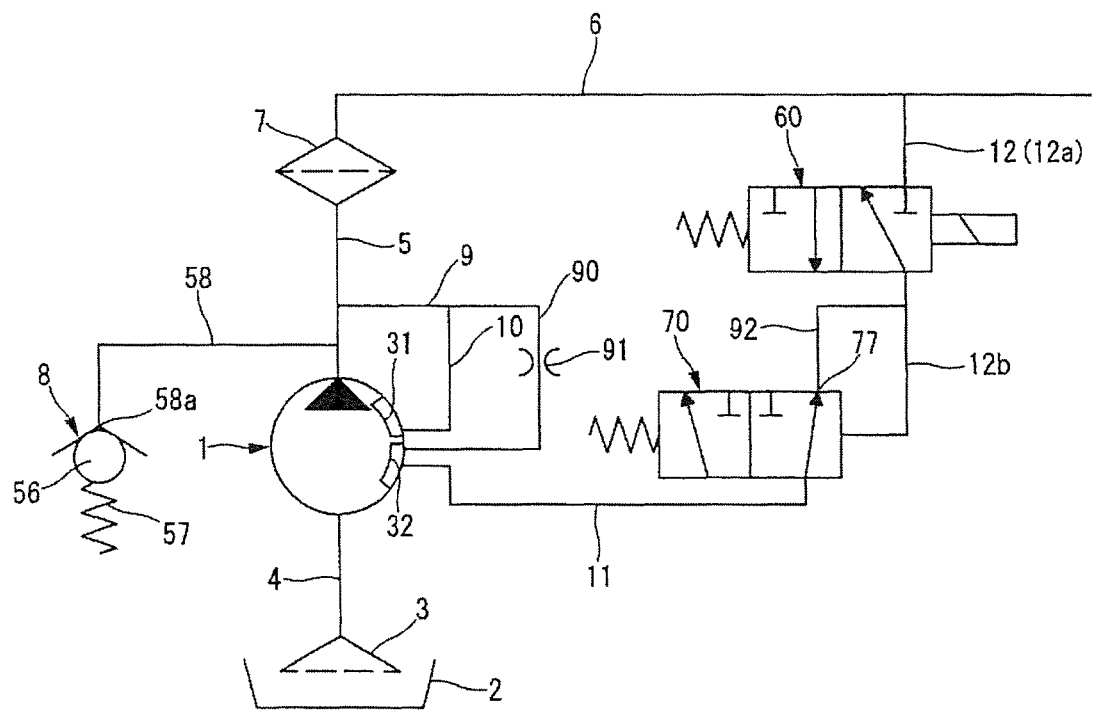
FIG. 28 is a schematic view showing a hydraulic circuit and an oil pump of a variable displacement pump according to a fourth embodiment of the present invention.

FIG. 28 shows a fourth embodiment. This embodiment has the structure identical to that of the third embodiment. There is provided a connection passage 90 constantly connecting the second control hydraulic chamber 32 and the first supply passage 9 bifurcated from the discharge passage 5. An orifice (throttling) is provided in the middle of the connection passage 90. Accordingly, the discharge pressure is constantly supplied through the orifice 91 to the second control hydraulic chamber 32.

Moreover, a third supply and discharge passage 92 is provided by being bifurcated from the supply passage 12 on the downstream side of the electromagnetic switching valve 60 of the control passage 12. The third supply and discharge passage 92 is arranged to be connected to the connection port 77 of the pilot valve 70. Besides, the supply port 79 in the third embodiment is varied to a drain port 79 for discharging the hydraulic pressure.

[Operations and Effects in Fourth Embodiment]

Figure 29:
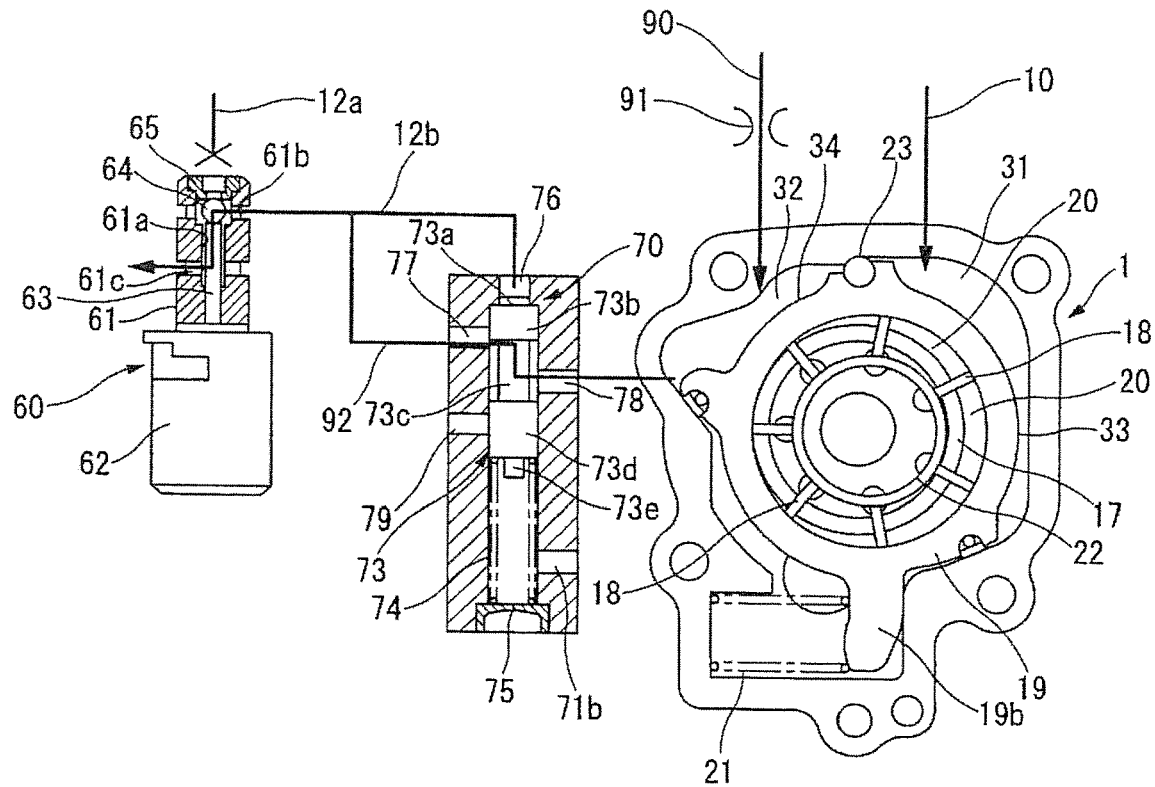
FIG. 29 is an operation explanation view of the variable displacement pump according to this embodiment.
Figure 30:
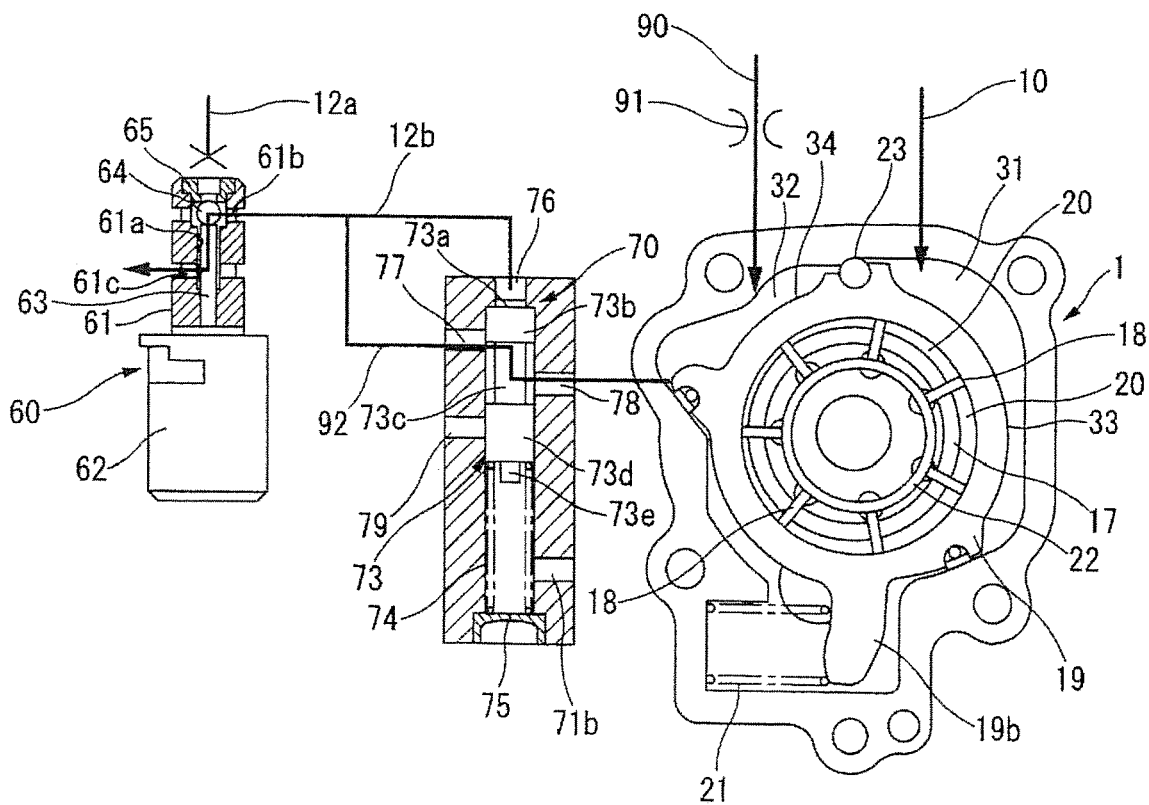
FIG. 30 is an operation explanation view of the variable displacement pump according to this embodiment.
Figure 33:
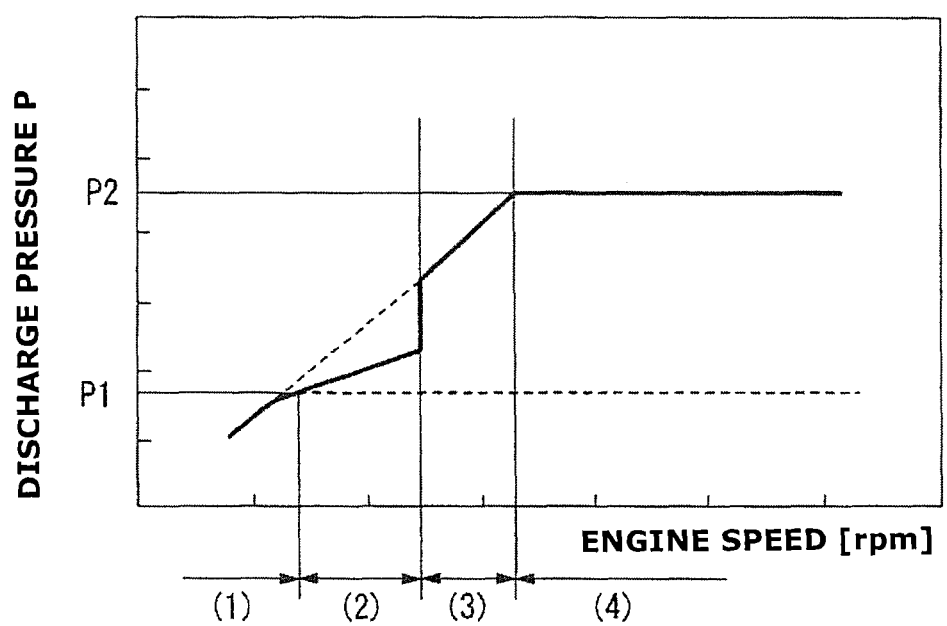
FIG. 33 is a graph showing a relationship between an engine speed and a pump discharge pressure in the variable displacement pump according to this embodiment.

Accordingly, in this embodiment, in the low rotation region (regions (1) and (2) in FIG. 33) from the engine start, the oil pump 1 becomes the first state shown in FIG. 29 and FIG. 30. That is, the electromagnetic switching valve 60 is energized to close the opening port 65a, and to connect the supply and discharge passage 12b on the downstream side and the drain hole 61c. On the other hand, in the pilot valve 70, the spool valve 73 is urged to the uppermost position by the spring force of the valve spring 74, so that the first small diameter shaft portion 73a is seated on the small diameter stepped portion 71a which is the seat surface, like the cases shown in FIG. 23 and FIG. 24 of the third embodiment. Accordingly, the supply and discharge port 78 and the connection port 77 are connected by the second small diameter shaft portion 73c. The drain port 79 is closed by the second land portion 73d.

Consequently, the discharge pressure which is the low pressure is supplied to the second control hydraulic chamber 32 by the orifice 91. However, the hydraulic fluid within the second control hydraulic chamber 32 is discharged through the supply and discharge port 78, the connection port 77, the third supply and discharge passage 92, the supply and discharge passage 12b on the downstream side, and the drain hole 61c to the oil pan 2, so that the second control hydraulic chamber 32 becomes the low pressure state.

In this first state, as shown in FIG. 33, when the discharge pressure P reaches P1, the force acted to the cam ring 19 becomes greater than the spring force of the coil spring 21, so that the eccentric amount of the cam ring 19 becomes small to control the increase of the discharge pressure. That is, the discharge pressure characteristics P of the pump is controlled to the low pressure state in which the pressure is started to be increased in accordance with the increase of the engine rotation, as shown by P1.

Figure 31:
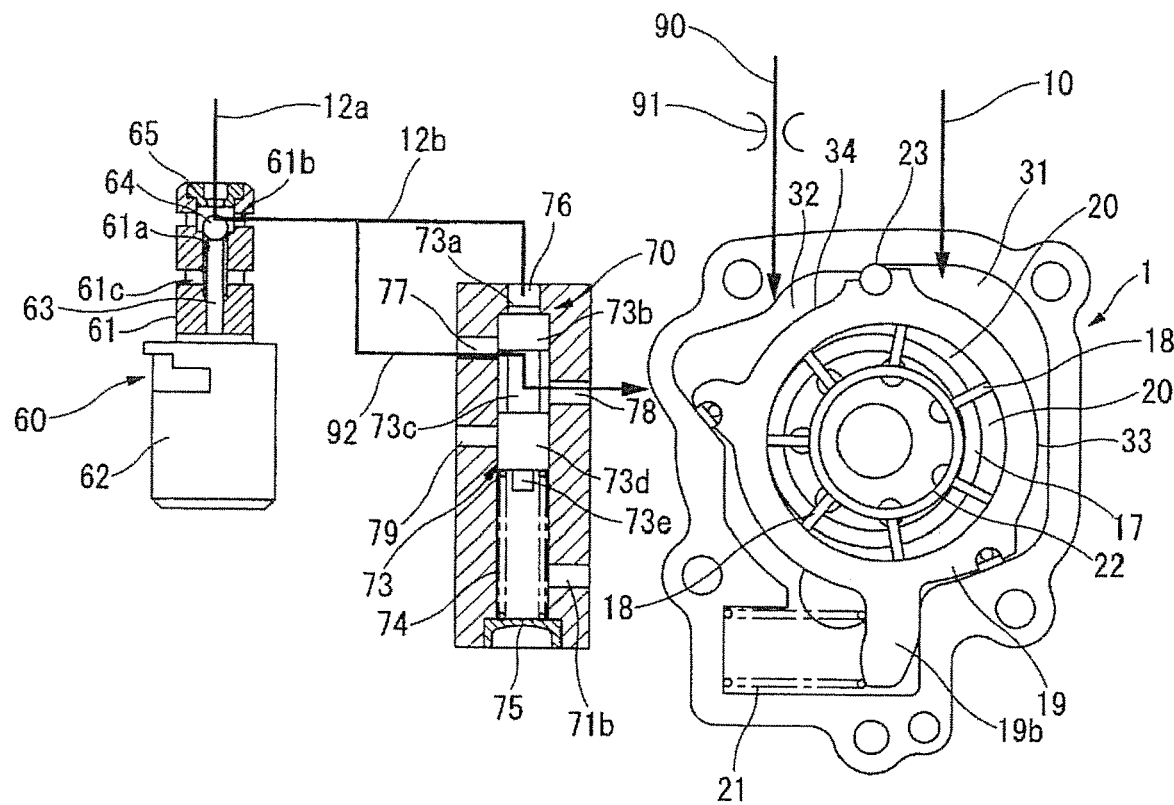
FIG. 31 is an operation explanation view of the variable displacement pump according to this embodiment.

Next, when the engine speed is increased to the region (3) of FIG. 33, the oil pump 1 becomes the second state shown in FIG. 31. That is, as shown in FIG. 31, in the electromagnetic switching valve 60 to which the OFF signal is outputted, the ball valve element 64 is separated from the valve seat 65 in accordance with the rearward movement of the push rod 63, so that the opening port 65a is opened to connect the upstream portion 12a of the control passage 12, and the supply and discharge passage 12b on the downstream side. Accordingly, the hydraulic pressure of the main oil gallery 6 is acted to the upper end surface of the first small diameter shaft portion 73a of the spool valve 73, so that the spool valve 73 is moved in the downward direction against the spring force of the valve spring 74. With this, in the pilot valve 70, the drain port 79 is closed by the second land portion 73d, and the connection port 77 and the supply and discharge port 78 are connected by the second small diameter shaft portion 73c.

Therefore, the discharge pressure of the discharge passage 5 is constantly supplied through the connection passage 90 and the orifice 91 to the second control hydraulic chamber 32. Moreover, the hydraulic pressure of the main oil gallery 6 is supplied through the control passage 12 and the third supply and discharge passage 92 to the second control hydraulic chamber 32.

When the discharge pressure of the main oil gallery 6 is supplied to the second control hydraulic chamber 32, it is acted through the second pressure receiving surface 34 in the direction in which the eccentric amount of the cam ring 19 is increased. Accordingly, the eccentric amount of the cam ring 19 becomes large, so that the discharge pressure is increased to P2 in FIG. 33.

Figure 32:
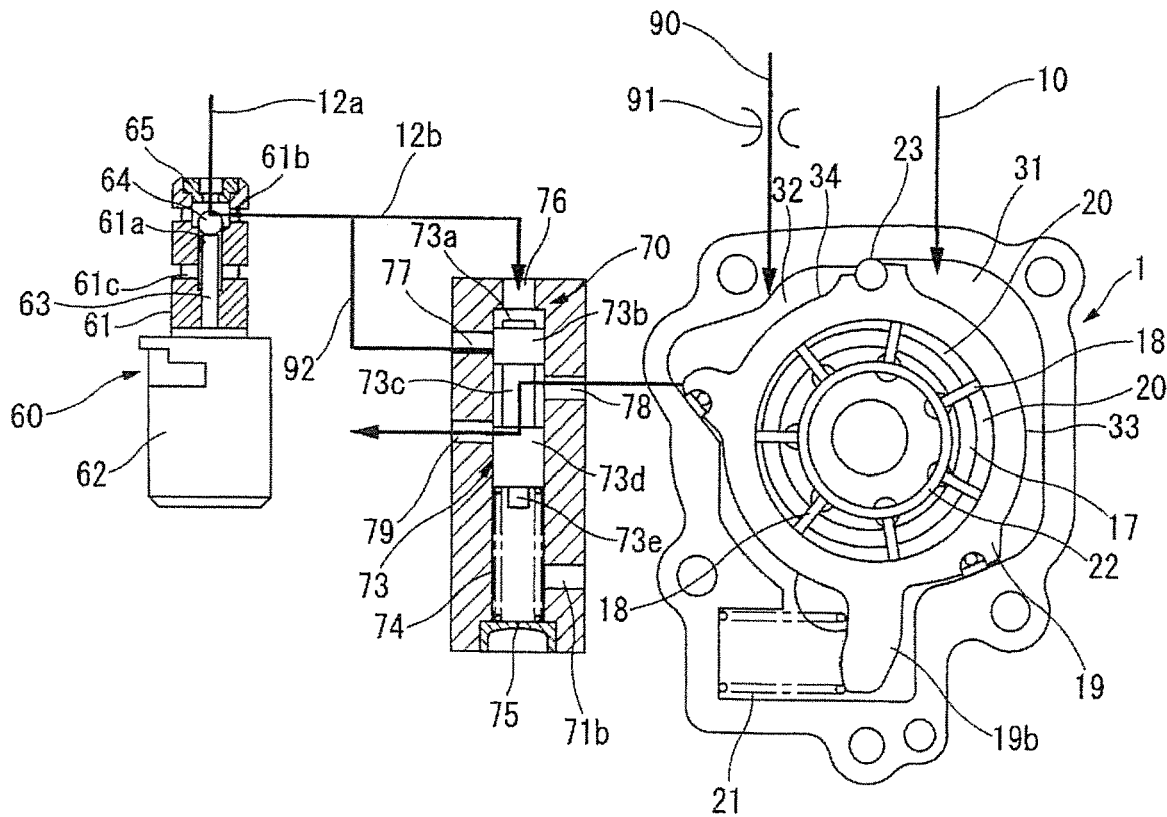
FIG. 32 is an operation explanation view of the variable displacement pump according to this embodiment.

When the engine speed is further increased to be the high rotation speed region shown by (4) in FIG. 33, the pilot valve 70 becomes the third state shown in FIG. 32. That is, in this state, the control pressure which is from the control passage 12, and which is acted to the upper end surface of the first small diameter shaft portion 73a becomes large. Accordingly, the spool valve 73 is moved in the downward direction against the spring force of the valve spring 74 so as to close the connection port 77 by the first land portion 73b, and to connect the supply and discharge port 78 and the drain port 79 through the second small diameter shaft portion 73c. Therefore, the supply of the discharge pressure of the main gallery 6 to the second control hydraulic chamber 32 is stopped. On the other hand, the hydraulic fluid within the second control hydraulic chamber 32 is discharged through the supply and discharge port 78 and the drain port 79 to the oil pan 2. By these operations of the pilot valve 70, the discharge pressure P is controlled to be the constant value P2.

Other structures are identical to those of the third embodiment. Accordingly, in this embodiment, it is also possible to obtain the operations and the effects such as the simplification of the piping by the single control passage 12, like the third embodiment.

The present invention is not limited to the above-described embodiments. For example, it is possible to perform a detailed discharge pressure control of the oil pump 1 by increasing the control hydraulic chambers.

The invention claimed is:

1. A variable displacement pump arranged to supply oil to a main oil gallery through an oil filter provided in a cylinder block, the variable displacement pump comprising:
   a pump body including a pump receiving chamber formed therein;
   a pump constituting section received in the pump receiving chamber, arranged to be driven and rotated by an internal combustion engine, and structured to vary volumes of a plurality of pump chambers, and thereby discharge oil sucked from a suction portion through a discharge portion and the oil filter to the mail oil gallery;
   a movable member within which the pump constituting section is received, and which is arranged to be moved to vary variation amounts of the volumes of the pump chambers;
   an urging mechanism provided with a set load, and arranged to urge the movable member in a direction in which the variation amounts of the volumes of the plurality of the pump chambers are increased;
   a supply passage formed within the pump body, and bifurcated in the pump body from a passage between the discharge portion and the oil filter;
   a first control hydraulic chamber formed between the moveable member and a circumferential wall of the pump body forming the pump receiving chamber, and arranged to receive the oil discharged from the discharge portion through the supply passage, and thereby act a force to the movable member in a direction in which the variation amounts of the volumes of the plurality of the pump chambers are decreased;
   a second control hydraulic chamber formed between the moveable member and the circumferential wall of the pump body forming the pump receiving chamber, and arranged to receive the oil discharged from the discharge portion through the supply passage into the second control hydraulic chamber, and thereby act a force to the movable member in a direction in which the variation amounts of the volumes of the plurality of the pump chambers are increased;
   a switching mechanism connected to a control passage bifurcated from the main oil gallery, and arranged to be controlled by a control unit; and
   a control mechanism connected to the switching mechanism, and arranged to switch a first state in which the second control hydraulic chamber is connected to atmosphere, and a second state in which the second control hydraulic chamber and the supply passage are connected, in accordance with a hydraulic pressure of oil introduced through the switching mechanism.

2. The variable displacement pump as claimed in claim 1, wherein the control mechanism is arranged to supply the discharge pressure from the discharge portion to the second control hydraulic chamber, or to discharge a hydraulic fluid within the second control hydraulic chamber; and when the control mechanism supplies the discharge pressure from the discharge portion to the second control hydraulic chamber at a speed of the pump that is higher than a predetermined speed, the control mechanism discharges the hydraulic fluid of the second control hydraulic chamber in accordance with an increase of the discharge pressure so as to decrease and adjust the pressure within the second control hydraulic chamber.

3. The variable displacement pump as claimed in claim 2, wherein the control mechanism includes
   an introduction port arranged to introduce a control hydraulic pressure from the control passage, and a valve body including a discharge side connection port connected to the second control hydraulic chamber, and a drain port connected to a low pressure portion,
   a spool valve received within the valve body to be slideable in an axial direction of the valve body, and arranged to switch a connection and a disconnection of the discharge side connection port and the drain port with respect to the second control hydraulic chamber in accordance with an axial sliding position, and
   a control spring elastically mounted within the valve body, and arranged to urge the spool valve on one axial side of the valve body by an urging force smaller than an urging force of the urging mechanism.

4. The variable displacement pump as claimed in claim 3, wherein the variable displacement pump is configured to attain
   the first state in which the drain port and the second control hydraulic chamber are connected, at a first position at which the spool valve is maximally moved relative to the one axial side of the valve body by being urged by the control spring;
   the second state in which the discharge side connection port and the second control hydraulic chamber are connected, and in which the drain port and the second control hydraulic chamber are disconnected, at a second position at which the spool valve is moved relative to another axial side of the valve body against the spring force of the control spring by the control hydraulic pressure supplied to the introduction port in accordance with the increase of the discharge pressure; and
   a third state in which the discharge side connection port and the second control hydraulic chamber are connected, and in which the drain port and the second control hydraulic chamber are connected, at a third position to which the spool valve is further moved relative to the another axial side of the valve body by the control hydraulic pressure by the further increase of the discharge pressure.

5. The variable displacement pump as claimed in claim 4, wherein the spool valve includes land portions which are positioned at both axial end portions of the spool valve, and at a middle position between the both axial end portions, and which are arranged to be slideable on the valve body, and small diameter shaft portions formed, respectively, between the land portions; and the spool valve is arranged to connect the discharge side connection port and the drain port to the second control hydraulic chamber by outer circumferences of the small diameter shaft portions, and to disconnect the discharge side connection port and the drain port from the second control hydraulic chamber by the land portions.

6. The variable displacement pump as claimed in claim 5, wherein the introduction port is provided at the one axial end of the valve body; and the spool valve includes a pressure receiving surface formed at one axial end portion of the spool valve on an introduction port side, and arranged to receive the control hydraulic pressure supplied from the control passage.

7. The variable displacement pump as claimed in claim 6, wherein the discharge side connection port and the drain port are provided in a circumferential wall of the valve body in radial directions.

8. The variable displacement pump as claimed in claim 1, wherein the control mechanism includes a first control portion and a second control portion;
the first control portion is arranged to supply the discharge pressure from the discharge portion to the second control hydraulic chamber, or to discharge hydraulic fluid within the second control hydraulic chamber;
the second control portion is arranged to discharge the hydraulic fluid within the second control hydraulic chamber through a drain passage, or to disconnect the second control hydraulic chamber and the drain passage; and
when the first control portion supplies the discharge pressure from the discharge portion to the second control hydraulic chamber at a speed of the pump that is higher than a predetermined speed, the second control portion is arranged to discharge the hydraulic fluid within the second control hydraulic chamber in accordance with an increase of the discharge pressure, and thereby decrease and adjust the pressure within the second control hydraulic chamber.

9. The variable displacement pump as claimed in claim 8, wherein
the first control portion includes
a first valve body including a first introduction port arranged to introduce the control hydraulic pressure passed through the control passage, a discharge side connection port connected to the second control hydraulic chamber, and a drain port connected to a low pressure portion,
a first spool valve received within the first valve body to be slideable in an axial direction, and arranged to switch a connection state of the discharge side connection port and the first drain port to the second control hydraulic chamber in accordance with an axial sliding position, and
a first control spring elastically mounted within the first valve body, and arranged to urge the first spool valve on one axial side by an urging force smaller than an urging force of the urging mechanism; and
the second control portion includes
a second valve body including a second introduction port arranged to introduce the control hydraulic pressure passed through the control passage, and a second drain port connected to the low pressure portion,
a second spool valve received within the second valve body to be slideable in an axial direction, and arranged to switch a connection state of the second drain port to the second control hydraulic chamber in accordance with an axial sliding position, and
a second control spring received within the second valve body to be slideable in the axial direction, and arranged to urge the second spool valve on the one axial side by an urging force smaller than the urging force of the urging mechanism.

10. The variable displacement pump as claimed in claim 9, wherein the urging force of the second control spring is larger than the urging force of the first control spring.

11. The variable displacement pump as claimed in claim 1, wherein a pressure receiving area of the first control hydraulic chamber is greater than a pressure receiving area of the second control hydraulic chamber;
the control mechanism is arranged to supply the discharge pressure from the discharge portion to the second control hydraulic chamber, or to discharge a hydraulic fluid within the second control hydraulic chamber; and
when the control mechanism supplies the discharge pressure to the second control hydraulic chamber at a speed of the pump that is higher than a predetermined speed, the control mechanism is arranged to move the movable member in a direction in which the variation amounts of the volumes of the plurality of the pump chambers are decreased, by a difference between the pressure receiving areas of the first and second control hydraulic chambers in accordance with an increase of the hydraulic pressure.

12. The variable displacement pump as claimed in claim 1, wherein
the second control hydraulic chamber is arranged to receive the hydraulic pressure from the discharge portion through an orifice;
the control mechanism is arranged to supply the discharge pressure to the second control hydraulic chamber through the switching mechanism from a bifurcated portion of the control passage, or to discharge hydraulic fluid within the second control hydraulic chamber; and
when the control mechanism discharges the discharge pressure from the bifurcated portion of the control passage to the second control hydraulic chamber at a speed of the pump that is higher than a predetermined speed, the control mechanism is arranged to discharge the hydraulic fluid within the second control hydraulic chamber in accordance with an increase of the discharge pressure, and thereby decrease and adjust the pressure within the second control hydraulic chamber.

13. The variable displacement pump as claimed in claim 12, wherein the hydraulic fluid within the second control hydraulic chamber is discharged through both the switching mechanism and the control mechanism, or through only the control mechanism.

14. The variable displacement pump as claimed in claim 1, wherein the switching mechanism is installed in the internal combustion engine.

15. The variable displacement pump as claimed in claim 14, wherein the switching mechanism is an electromagnetic switching valve arranged to be electrically controlled to be switched.

16. The variable displacement pump as claimed in claim 1, wherein the discharge portion is configured to discharge hydraulic fluid that is a lubricant oil for lubricating members within the internal combustion engine.

17. The variable displacement pump as claimed in claim 1, wherein the hydraulic fluid is supplied to a driving source of a variable valve actuating device, and an oil jet is arranged to supply the hydraulic fluid to a piston of the internal combustion engine.

18. A variable displacement pump arranged to supply oil to a main oil gallery through an oil filter provided in a cylinder block, the variable displacement pump comprising:
a pump body including a pump receiving chamber formed therein;
a rotor received in the pump receiving chamber, and driven and rotated by an internal combustion engine;
a plurality of vanes provided on an outer circumference of the rotor to be projectable and retractable;

a cam ring which separates a plurality of pump chambers within the cam ring, with the rotor and the vanes, and which is arranged to be moved within the pump receiving chamber to vary an eccentric amount with respect to a center of the rotor, and thereby increase or decrease pump volumes;

a suction portion which is opened to the pump chambers, and in which the pump volumes are increased by the rotation of the rotor;

a discharge portion which is opened to the pump chambers in which the pump volumes are decreased by the rotation of the rotor;

an urging mechanism provided with a set load, and arranged to urge the cam ring in a direction in which the eccentric amount is increased;

a supply passage formed within the pump body, and bifurcated in the pump body from a passage between the discharge portion and the oil filter;

a first control hydraulic chamber formed between the moveable member and a circumferential wall of the pump body forming the pump receiving chamber, and arranged to receive the oil discharged from the discharge portion through the supply passage, and thereby act a force in a direction in which the eccentric amount is decreased, to the cam ring;

a second control hydraulic chamber formed between the moveable member and the circumferential wall of the pump body forming the pump receiving chamber, and arranged to receive the oil discharged from the discharge portion through the supply passage into the second control hydraulic chamber, and thereby act a force in a direction in which the eccentric amount is increased, to the cam ring in cooperation with the urging mechanism;

a control mechanism connected to a switching mechanism connected to a control passage bifurcated from the main oil gallery, and arranged to switch a first state in which the second control hydraulic chamber is connected to atmosphere, and a second state in which the second control hydraulic chamber and the supply passage are connected, in accordance with a hydraulic pressure of the oil introduced through the switching mechanism.

19. The variable displacement pump as claimed in claim 18, wherein the first and second control hydraulic chambers are provided on an outer circumference side of the cam ring; and the first and second control hydraulic chambers are defined by a swing fulcrum on an outer circumference surface of the cam ring.

20. The variable displacement pump as claimed in claim 19, wherein the control mechanism is a pilot valve.

\* \* \* \* \*